US009382491B2

(12) United States Patent
McNeff et al.

(10) Patent No.: US 9,382,491 B2
(45) Date of Patent: Jul. 5, 2016

(54) HYDROCARBON SYNTHESIS METHODS, APPARATUS, AND SYSTEMS

(71) Applicant: SarTec Corporation, Anoka, MN (US)

(72) Inventors: Clayton V. McNeff, Andover, MN (US); Larry C. McNeff, Anoka, MN (US); Daniel Thomas Nowlan, Hugo, MN (US); Bingwen Yan, Shoreview, MN (US); Peter G. Greuel, Anoka, MN (US)

(73) Assignee: SarTec Corporation, Anoka, MN (US)

( * ) Notice: Subject to any disclaimer, the term of this patent is extended or adjusted under 35 U.S.C. 154(b) by 0 days.

(21) Appl. No.: 14/146,601

(22) Filed: Jan. 2, 2014

(65) Prior Publication Data

US 2014/0115955 A1    May 1, 2014

Related U.S. Application Data

(63) Continuation-in-part of application No. 13/934,713, filed on Jul. 3, 2013.

(60) Provisional application No. 61/667,813, filed on Jul. 3, 2012, provisional application No. 61/680,360, filed on Aug. 7, 2012, provisional application No. 61/702,582, filed on Sep. 18, 2012.

(51) Int. Cl.
*C10G 3/00* (2006.01)
*C10L 3/08* (2006.01)
(Continued)

(52) U.S. Cl.
CPC .. *C10L 3/08* (2013.01); *B01J 3/008* (2013.01); *B01J 8/087* (2013.01); *B01J 8/10* (2013.01);
(Continued)

(58) Field of Classification Search
USPC ............................................. 585/240; 44/308
See application file for complete search history.

(56) References Cited

U.S. PATENT DOCUMENTS

| 2,154,835 A | 4/1939 | Eisenlohr |
| 4,138,336 A | 2/1979 | Mendel et al. |

(Continued)

FOREIGN PATENT DOCUMENTS

| AU | 2011200090 | 2/2011 |
| BR | 06001602 | 10/2007 |

(Continued)

OTHER PUBLICATIONS

Wiggers et al., Biofuels from continuous fast pyrolysis of soybean oil: A pilot plant study, 2009, Bioresource Technology, vol. 100, pp. 6570-6577.*

(Continued)

*Primary Examiner* — In Suk Bullock
*Assistant Examiner* — Youngsul Jeong
(74) *Attorney, Agent, or Firm* — Pauly, DeVries Smith & Deffner, L.L.C.

(57) ABSTRACT

Embodiments of the invention include apparatus and systems for hydrocarbon synthesis and methods regarding the same. In an embodiment, the invention includes a method for creating a hydrocarbon product stream comprising reacting a reaction mixture in the presence of a catalyst inside of a reaction vessel to form a product mixture, the reaction mixture comprising a carbon source and water. The temperature inside the reaction vessel can be between 450 degrees Celsius and 600 degrees Celsius and the pressure inside the reaction vessel can be above supercritical pressure for water. In an embodiment, the invention includes an extrusion reactor system for creating a hydrocarbon product stream. The temperature inside the extrusion reactor housing between 450 degrees Celsius and 600 degrees Celsius. Pressure inside the reaction vessel can be above supercritical pressure for water. Other embodiments are also included herein.

18 Claims, 17 Drawing Sheets

US 9,382,491 B2

Page 2

(51) Int. Cl.
  *C10L 1/02* (2006.01)
  *B01J 8/08* (2006.01)
  *B01J 8/10* (2006.01)
  *B01J 19/20* (2006.01)
  *B01J 3/00* (2006.01)
  *C11C 3/00* (2006.01)
  *B01J 38/02* (2006.01)
  *B01J 21/06* (2006.01)
  *C10L 3/10* (2006.01)
  *B01J 21/20* (2006.01)
  *B01J 35/00* (2006.01)

(52) U.S. Cl.
  CPC ........ *B01J 19/20* (2013.01); *B01J 38/02* (2013.01);
       *C10G 3/44* (2013.01); *C10G 3/45* (2013.01);
       *C10L 1/02* (2013.01); *C10L 1/023* (2013.01);
       *C11C 3/00* (2013.01); *B01J 21/06* (2013.01);
       *B01J 21/066* (2013.01); *B01J 21/20* (2013.01);
       *B01J 35/0013* (2013.01); *B01J 2208/00168*
       (2013.01); *B01J 2208/00539* (2013.01); *B01J*
       *2208/00628* (2013.01); *B01J 2208/00814*
       (2013.01); *B01J 2219/00087* (2013.01); *B01J*
       *2219/00162* (2013.01); *B01J 2219/00186*
       (2013.01); *C10G 2300/805* (2013.01); *C10L*
       *3/106* (2013.01); *C10L 2200/0469* (2013.01);
       *C10L 2270/023* (2013.01); *C10L 2290/06*
       (2013.01); *C10L 2290/50* (2013.01); *Y02P*
       *20/544* (2015.11); *Y02P 30/20* (2015.11)

(56) References Cited

U.S. PATENT DOCUMENTS

| | | | |
|---|---|---|---|
| 4,911,941 A | 3/1990 | Katz et al. | |
| 5,108,597 A | 4/1992 | Funkenbusch et al. | |
| 5,182,016 A | 1/1993 | Funkenbusch et al. | |
| 5,254,262 A | 10/1993 | Funkenbusch et al. | |
| 5,271,833 A | 12/1993 | Funkenbusch et al. | |
| 5,346,619 A | 9/1994 | Funkenbusch et al. | |
| 5,540,834 A | 7/1996 | Carr et al. | |
| 6,153,773 A | 11/2000 | Kolstad et al. | |
| 6,713,051 B2 | 3/2004 | Mayes et al. | |
| 7,179,379 B2 | 2/2007 | Appel et al. | |
| 7,288,685 B2 | 10/2007 | Marker | |
| 7,301,060 B2 | 11/2007 | Appel et al. | |
| 7,452,841 B2 | 11/2008 | Ignatchenko et al. | |
| 7,476,296 B2 | 1/2009 | Appel et al. | |
| 7,501,379 B2 | 3/2009 | Ignatchenko et al. | |
| 7,659,432 B2 | 2/2010 | Ignatchenko et al. | |
| 7,683,232 B2 | 3/2010 | Schmidt et al. | |
| 7,691,159 B2 * | 4/2010 | Li ............................... | 44/605 |
| 7,771,699 B2 | 8/2010 | Adams et al. | |
| 7,772,414 B1 | 8/2010 | Hybertson et al. | |
| 7,777,085 B2 | 8/2010 | Berry et al. | |
| 7,780,946 B2 | 8/2010 | Wormsbecher | |
| 7,850,841 B2 | 12/2010 | Koivusalmi et al. | |
| 7,883,882 B2 | 2/2011 | Franklin et al. | |
| 7,925,273 B2 | 4/2011 | Fomukong et al. | |
| 7,928,273 B2 | 4/2011 | Bradin | |
| 7,935,515 B2 | 5/2011 | Franklin et al. | |
| 7,967,973 B2 | 6/2011 | Myllyoja et al. | |
| 7,998,339 B2 | 8/2011 | Myllyoja et al. | |
| 8,003,833 B2 | 8/2011 | Appel et al. | |
| 8,076,498 B2 | 12/2011 | Elst et al. | |
| 2002/0173682 A1 | 11/2002 | Tullio et al. | |
| 2003/0143156 A1 | 7/2003 | Wormsbecher | |
| 2004/0188340 A1 | 9/2004 | Appel et al. | |
| 2004/0192980 A1 | 9/2004 | Appel et al. | |
| 2004/0192981 A1 | 9/2004 | Appel et al. | |
| 2006/0004237 A1 | 1/2006 | Appel et al. | |
| 2006/0246141 A1 | 11/2006 | Liversidge et al. | |
| 2007/0098625 A1 | 5/2007 | Adams et al. | |
| 2007/0137097 A1 | 6/2007 | Ikura | |
| 2008/0194811 A1 | 8/2008 | Mcneff | |
| 2008/0275144 A1 | 11/2008 | Van Hardeveld et al. | |
| 2009/0014354 A1 | 1/2009 | Knuuttila et al. | |
| 2009/0069586 A1 | 3/2009 | Oku et al. | |
| 2009/0255171 A1 | 10/2009 | Dumesic et al. | |
| 2009/0297495 A1 | 12/2009 | Kerovuo et al. | |
| 2010/0010246 A1 | 1/2010 | Yan et al. | |
| 2010/0048930 A1 | 2/2010 | Elst et al. | |
| 2010/0050502 A1 | 3/2010 | Wu et al. | |
| 2010/0081181 A1 | 4/2010 | Berry et al. | |
| 2010/0081835 A1 | 4/2010 | Wu et al. | |
| 2010/0113849 A1 * | 5/2010 | Bartek et al. ................ | 585/240 |
| 2010/0151535 A1 | 6/2010 | Franklin et al. | |
| 2010/0151539 A1 | 6/2010 | Franklin et al. | |
| 2010/0170147 A1 * | 7/2010 | McNeff et al. ................ | 44/605 |
| 2010/0287823 A1 | 11/2010 | Misra et al. | |
| 2010/0305346 A1 | 12/2010 | Hara et al. | |
| 2010/0324310 A1 | 12/2010 | Dumesic et al. | |
| 2011/0009501 A1 | 1/2011 | Ernst | |
| 2011/0035993 A1 | 2/2011 | Loescher | |
| 2011/0105814 A1 | 5/2011 | Koivusalmi et al. | |
| 2011/0213040 A1 | 9/2011 | Hassan et al. | |
| 2011/0287991 A1 | 11/2011 | Dubois | |
| 2011/0306808 A1 | 12/2011 | Appel et al. | |
| 2011/0319849 A1 | 12/2011 | Collias et al. | |
| 2012/0055077 A1 | 3/2012 | Savage et al. | |
| 2014/0046104 A1 | 2/2014 | Mcneff et al. | |

FOREIGN PATENT DOCUMENTS

| | | |
|---|---|---|
| CA | 2601472 | 9/2006 |
| CA | 2607931 | 11/2006 |
| CN | 101870989 | 10/2010 |
| DE | 19620378 | 2/1999 |
| EP | 1642560 | 4/2006 |
| EP | 1869173 | 12/2007 |
| EP | 2290035 | 3/2011 |
| EP | 2290045 | 3/2011 |
| FR | 2938536 | 5/2010 |
| FR | 2947564 | 1/2011 |
| JP | 02289692 | 11/1990 |
| WO | 9108677 | 6/1991 |
| WO | 9627632 | 9/1996 |
| WO | 9707187 | 2/1997 |
| WO | 02102337 | 12/2002 |
| WO | 2004108873 | 12/2004 |
| WO | 2006121584 | 11/2006 |
| WO | 2007068097 | 6/2007 |
| WO | 2008152199 | 12/2008 |
| WO | 2009003039 | 12/2008 |
| WO | 2006096834 A3 | 8/2009 |
| WO | 2009143159 | 11/2009 |
| WO | 2009115322 | 1/2010 |
| WO | 2010005391 | 1/2010 |
| WO | 2010036333 | 4/2010 |
| WO | 2010132628 | 11/2010 |
| WO | 2010141794 | 12/2010 |
| WO | 2010147955 | 12/2010 |
| WO | 2010148057 | 12/2010 |
| WO | 2011004111 | 1/2011 |
| WO | 2011012438 | 2/2011 |
| WO | 2011012439 | 2/2011 |
| WO | 2011012440 | 2/2011 |
| WO | 2011130573 | 10/2011 |
| WO | 2011150410 | 12/2011 |
| WO | 2011150411 | 12/2011 |
| WO | 2014008355 | 1/2014 |

OTHER PUBLICATIONS

Aimaretti, N. et al., "Batch Study of Glycerol Decomposition in One-Stage Supercritical Production of Biodiesel", Energy & Fuels 2009, vol. 23, pp. 1076-1080.

Akhtar, Javaid et al., "A Review on Process Conditions for Optimum Bio-Oil Yield in Hydrothermal Liquefaction of Biomass", Renewable and Sustainable energy Reviews 15 (2011), pp. 1615-1624.

Annen, M J. et al., "Development of Porous Zirconia spheres by Polymerization-Induced Colloid Aggregation—Effect of Polymer-

(56) References Cited

OTHER PUBLICATIONS ization Rate", Journal of Materials Science, vol. 29, 1994, pp. 6123-6130.
Billaud, Francis et al., "Pyrolysis of Secondary Raw Material from Used Frying Oils", Récents Progrés en Génie des Procédés, Numéro 94—2007 ISBN 2-910239-68-3, Ed. SFGP, Paris, France (8 pages).
Chen, Ching-Hung et al., "Biodiesel Production from Supercritial Carbon Dioxide Extracted Jatropha Oil Using Subcritical Hydrolysis and Supercritical Methylation", J. of Supercritical Fluids, vol. 52, 2010, pp. 228-234.
Chen, Ching-Hung et al., "Subcritical Hydrolysis and Supercritical Methylation of Supercritical Carbon Dioxide Extraction of Jatropha Oil", Separation and Purification Technology, vol. 74, 2010, pp. 7-13.
Choudhary, T. V. et al., "Renewable Fuels via Catalytic Hydrodeoxygenation", Applied Catalysis A: General, vol. 397, 2011 pp. 1-12.
Czernik, Stefan et al., "Hydrogen by Catalytic Steam Reforming of Liquid Byproducts from biomass Thermoconversion Processes", Ind. Eng. Chem. Res. vol. 41, 2002, pp. 4209-4215.
Dagle, Robert A. et al., "Methanol Steam Reforming for Hydrogen Production", Chem. Rev., vol. 107, 2007, pp. 3992-4021.
Dandik, Levent et al., "Catalytic Conversion of Used Oil to Hydrocarbon Fuels in a Fractionating Pyrolysis Reactor", Energy and Fuels, vol. 12, 1998, pp. 1148-1152.
De La Casa, R.M. et al., "Modification of the Activities of Two Different lipases from Candida Rugosa with Dextrans", Enzyme and Microbial Technology, vol. 30, 2002, pp. 30-40.
De Lasa, Hugo et al., "Catalytic Steam Gasificationof Biomass: Catalysts, Thermodynamics and Kinetics", Chemical Reviews, vol. 111, 2011, pp. 5404-5433.
De Paula, Ariela V. et al., "Screening of Food Grade Lipases to be Used in Esterification and Intersterification Reactions of Industrial Interest", Appl Biochem Biotechnol, vol. 160, pp. 1146-1156.
Dierker, Markus et al., "Surfactants from Oleic, Erucic, and Petroselinic Acid: Synthesis and Properties", Eur. J. Lipid Sci. Technol., vol. 112, 2010, pp. 122-136.
Dry, Mark E. et al., "High Quality Diesel via the Fischer-Tropsch Process—A Review", J. Chem Technol Biotechnol., vol. 77, 2001, pp. 43-50.
Dry, Mark E., "The Fischer-Tropsch process—Commercial Aspects", Catalysis today 6 (3), 1990, pp. 183-206.
Frykman, Hans B. et al., "Screening Catalytic Lipase Activities with an Analytical Supercritical Fluid Extractor", JAOCS, vol. 75, 1998, pp. 517-520.
Fu, Jie et al., "Activated Carbons for Hydrothermal Decarboxylation of Fatty Acids", ACS Catalysis, vol. 1, 2011, pp. 227-231.
Fujita, Kazunori et al., "Hydrolysis of Glycerol Trioleate and Extraction of Its Fatty acid Under Co2 Supercritical Conditions", The Chemical Society of Japan, vol. 1, 1995, pp. 79-82.
Fureby, Anna M. et al., "Preparation of Diglycerides by Lipase-Catalyzed Alcoholysis of Triglycerides", Enzyme and Microbial Technology, vol. 20, 1997, pp. 198-206.
Guerbuez, Elif I. et al., "Dual-Bed Catalyst System for C-C Coupling of Biomass-Derived Oxygenated Hydrocarbons to Fuel-Grade Compounds", Green Chemistry, vol. 12, 2010, pp. 223-227.
Guthalugu, Nagesha K. et al., "Optimization of Enzymatic Hydrolysis of Triglycerides in Soy Deodorized Distillate with Supercritical Carbon Dioxide", Biochemical Engineering Journal, vol. 29, 2006, pp. 220-226.
Hampson, J.W. et al., "Effect of Moisture Content on Immobilized Lipase-Catalyzed Tricylglycerol Hydrolysis Under Supercritical Carbon Dioxide Flow in a Tubular Fixed-Bed Reactor", JAOCS, vol. 76, 1999, pp. 777-781.
Hampson, J.W. et al., "Separation of Tripalmitin from Its Hydrolysis Products by Simple Isocratic Reversed-Phase High-Performance Liquid Chromatography", JAOCS, vol. 75, 1998, pp. 539-540.
Hara, Michikazu, "Biomass conversion by a solid acid catalyst", Energy Environ. Sci., vol. 3, 2010, pp. 601-607.

Haryanto, Agus et al., "Current Status of Hydrogen Production Techniques by Steam Reforming of Ethanol: A Review", Energy and Fuels, vol. 19, 2005, pp. 2098-2106.
Hirata, Hirofumi et al., "Substrate-Solvent Dependence of Enantioselectivity in Porcine Pancreatic Lipase Catalyzed Transesterification Between Tributyrylglycerol and Secondary Alcohol in Organic Solvent", J. Oleo Sci., vol. 51, 2002, pp. 539-547.
Holliday, Russell L. et al., "Hydrolysis of Vegetable Oils in Sub- and Supercritical Water", Industrial and Engineering Chemistry Research, vol. 36, No. 3, 1997, pp. 932-935.
International Search Report and Written Opinion, for PCT/US2013/049250, mailed Nov. 1, 2013 (11 pages).
Irimescu, Roxana et al., "Comparison of Acyl Donors for Lipase-Catalyzed Production of 1,3-Dicapryloy1-2-eicosapentaenoylglycerol", JAOCS, vol. 78, 2001, pp. 65-70.
Isayama, Yohei et al., "Biodiesel production by supercritical process with crude bio-methanol prepared by wood gasification", Bioresource Technology, vol. 99, 2008, pp. 4775-4779.
Ishai, Paul B. et al., "Influence of Cyclosporine A on Molecular Interactions in Lyotropic Reverse Hexagonal Liquid Crystals", J. Phys. Chem. B, vol. 114, 2010, pp. 12785-12791.
Isono, Yasuyuki et al., "Interesterification of Triglyceride and Fatty Acid in a Mircoaqueous Reaction System Using Lipase-Surfactant Complex", Biosci. Biotech. Biochem., vol. 59 (9), 1995, 1632-1635.
Jiang, Xiaoxiang et al., "Upgrading Bio-Oil Through Emulsification with Biodiesel: Thermal Stability", Energy Fuels, vol. 24, 2010, pp. 2699-2706.
Jimenez-Morales, I. et al., "Calcined zirconium sulfate supported on MCM-41 silica as acid catalyst for ethanolysis of sunflower oil", Applied Catalysis B: Environmental, vol. 103, 2011, pp. 91-98.
Katsivela, E. et al., "Hydrolysis and Ester-Synthesis Activties of Crude Enzyme Preparation", Enzyme and Microbial technology, vol. 17, 1995, pp. 739-745.
King, Jerry W. et al., "Hydrolysis of soybean oil in a subcritical water flow reactor", Green Chemistry, vol. 1, 1999, pp. 261-264.
Koscsisova, Teodora et al., "Hydrolysis of fatty acid in esters in subcritical water", Eur. J. Lipid Sci. Technol., vol. 108, 2006, pp. 652-658.
Kubatova, Alena et al., "Triacylglyceride Thermal Cracking: Pathways to Cyclic Hydrocarbons", Energy & Fuels, 2011,14 pages.
Kusdiana, Dadan et al., "Effects of water on biodiesel fuel production by supercritical methanol treatment", Bioresource Technology, vol. 91, 2004, pp. 289-295.
Li, Lixiong et al., "Catalytic Hydrothermal Conversion of Triglycerides to Non-ester Biofuels", Energy Fuels, vol. 24, 2010, pp. 1305-1315.
Li, Wei et al., "Study on Acyl Migration Kinetics of Partial Glycerides: Dependence on Temperature and Water Activity", Journal of Molecular Catalysis B: Enzymatic, vol. 63, 2010, pp. 17-22.
Lopez, Dora E. et al., "Esterification and transesterification using modified-zirconia catalysts", Applied Catalysis A: General, vol. 339, 2008, pp. 76-83.
Lu, Jike et al., "Immobilized lipase Candida sp. 99-125 catalyzed methanolysis of glycerol trioleate: Solvent effect", Bioresource Technology, vol. 99, 2008, pp. 6070-6074.
Martinez, Jose L. et al., "Effect of Water on Canola oil Hydrolysis in an Online Extraction-Reaction System Using Supercritical Co2", Ind. Eng. Chem. Res., vol. 41, 2002, pp. 6475-6481.
Mazzieri, V.M. et al., "Non-Catalytic Biodiesel Process with Adsorption-Based Refining", Fuel, vol. 90, 2011, pp. 1186-1196.
Mcneff, Clayton V. et al., "Continuous Production of 5-Hydroxymethylfurfural from Simple and Complex Carbohydrates", Applied Catalysis A: General, vol. 384, Issues 1-2, Aug. 2010, pp. 65-69.
Minami, Eiji et al., "Kinetics of hydrolysis and methyl esterification for biodiesel production in two-step supercritical methanol process", Fuel, vol. 85, 2006, pp. 2479-2483.
Mohan, Dinesh et al., "Pyrolysis of wood/Biomass for Bio-Oil: A Critical Review", Energy and Fuels, vol. 20, 2006, pp. 848-889.
Moquin, Paul H. et al., "Kinetic modeling of hydrolysis of canola oil in supercritical media", Journal of Supercritical Fluids, vol. 45, 2008, pp. 94-101.

(56) References Cited

OTHER PUBLICATIONS

Ngaosuwan, Kanokwan et al., "Effect of solvent on hydrolysis and transesterification reactions on tungstated zirconia", Applied Catalysis A: General, vol. 380, 2010, pp. 81-86.
Ngaosuwan, Kanokwan et al., "Hydrolysis of Triglycerides Using Solid Acid Catalysts", Ind. Eng. Chem. Res, vol. 48, 2009, 4757-4767.
Ngaosuwan, Kanokwan et al., "Reaction Kinetics and Mechanisms for Hydrolysis and Transesterification of Triglycerides on Tungstated Zirconia", Top Catal, vol. 53, 2010, pp. 783-794.
O'connor, Charmian J. et al., "Determining the regio- and typo-selectivity of calf pregastric lipase", Journal of Molecular Catalysis B: Enzymatic, vol. 16, 2001, pp. 147-157.
Parve, Omar et al., "Lipase-Catalysed Enantioselective Hydrolysis: Interpretation of the Kinetic Results in Terms of Frontier Orbital Localisation", Tetrahedron, vol. 53, 1997, pp. 4889-4900.
Peterson, Andrew A. et al., "Thermochemical Biofuel Production in Hydrothermal Media: A Reivew of Sub- and Supercritical Water Technologies", Energy and Environmental Science, 2008, 1, pp. 32-65.
Piyatheerawong, Weera et al., "Enzymatic Preparation of Enantiomerically Pure sn-2, 3-Dicylglycerols: A Stereoselective Ethanolysis Approach", JAOCS, vol. 83, 2006, pp. 603-607.
Qi, Zhang et al., "Review of bioMass Pyrolysis Oil Properties and Upgrading Research", Energy Conversion and Management vol. 48, 2007, pp. 87-92.
Qualitative and Quantitative Analysis in GC and GCMS, Customer Support Centre, Shimadzu Asia Pacific Pte. Ltd., 2006, Singapore (32 pages_.
Restriction Requirement, for U.S. Appl. No. 13/943,713, mailed Feb. 13, 2014 (7 pages).
Robichaud, Michael J. et al., "An Improved Oil Emulsion Synthesis Method for Large, Porous Zirconia Particles for Packed- or Fluidized-Bed Protein Chromatography", Separation Science and Technology, vol. 32, 1997, pp. 2547-2559.
Saka, Shiro et al., "Useful Products from Lignocellulosics by Supercritical Water Technologies", The 2nd Joint International Conference on "Sustainable Energy and Environment (SEE 2006)", Nov. 2006, 5 pages.
Schmid,, U. et al., "Highly Selective Synthesis of 1,3-Oleoyl-2-Palmitoylglycerol by Lipase Catalysis", Biotechnology and Bioengineering, vol. 64, 1999, pp. 678-684.
Shieh, Chwen-Jen et al., "Optimized Enzymatic Synthesis of Geranyl Butyrate with Lipase AY from Candida Rugosa", Biotechnology and Bioengineering, vol. 51, 1996, pp. 371-374.
Takahashi, Yoshinori et al., "Characteristics of Lipase Modified with Water-soluble Acylating Reagents and Its Esterification Ability", Biosci. Biotech. Biochem., vol. 59, 1995, pp. 809-812.
Tanksale, Akshat et al., "A Review of catalytic Hydrogen production Processes from Biomass", Renewable and Sustainable Energy Reviews, vol. 14, 2010, pp. 166-182.
Tavakoli, Omid et al., "Squid Oil and Fat Production from Squid Wastes Using Subcritical Water Hydrolysis: Free Fatty Acids and Transesterification", Ind. Eng. Chem. Res., vol. 45, 2006, pp. 5675-5680.
Toor, Saqib S. et al., "Hydrothermal Liquefaction of Biomass: A Review of Subcritical Water Technologies", Energy 36 (2011), pp. 2328-2342.
Ulgen, Arda et al., "Conversion of Glycerol to Acrolein in the Presence of WO3/TiO2 Catalysts", Applied Catalysis A; General 400 (2011) pp. 34-38.
Van Tol, J. B. et al., "Do Organic Solvents Affect the Catalytic Properties of Lipase? Intrinsic Kinetic Parameters of Lipases in Ester Hydrolysis and Formation in Various Organic Solvents", Biotechnology and Bioengineering, vol. 47, 1995, pp. 71-81.
Varma, Mahesh N. et al., "Effect of Chain Length on Enzymatic Hydrolysis of p-Nitrophenyl Esters in Supercritical Carbon Dioxide", Appl Biochem Biotehnol, vol. 144, 2008, pp. 213-223.
Vieitez, Ignacio et al., "Continuous catalyst-free methanolysis and ethanolysis of soybean oil under supercritical alcohol/water mixtures", Renewable Energy, vol. 35., 2010, pp. 1976-1981.
White, D. H. et al., "Development of an Extruder-Feeder Biomass Direct Liquefactoin Process", Final Report, vol. 1, Oct. 1991, Parts 1-3, 294 pages.
White, Don H. et al., "Biomass Liquefaction Utilizing Extruder-Feeder Reactor System", Department of Chemical Engineering, University of Arizona, date unknown, pp. 106-116.
Yamakawa-Kobayashi, Kimiko et al., "Relation of the -514C/T Polymorphism in the Hepatic Lipase Gene to Serum HDL and LDL Cholesterol Levels in Postmenopausal Women Under Hormone Replacement Therapy", Atherosclerosis, vol. 162, 2002, pp. 17-21.
Yu, Yang et al., "Enzymatic Synthesis of Feruloyated Lipids: Comparison of the Efficiency of Vinyl Ferulate and Ethyl Ferulate as Substrates", J AM Oil Chem Soc, vol. 87, 2010, pp. 1443-1449.
Zheng, Yang et al., "Dual Response Surface-Optimized Process for Feruloylated Diacylglycerols by Selective Lipase-Catalyzed Transesterification in Solvent Free System", Bioresource Technology, vol. 100, 2009, pp. 2896-2901.
Adebanjo, Adenike O. et al., "Production of Diesel-Like Fuel and Other Value-Added Chemicals from Pyrolysis of Animal Fat", Energy & Fuels, vol. 19, 2005, pp. 1735-1741.
Albrecht, Ko et al., "A Brief Literature Overview of Various Routes to Biorenewable Fuels from Lipids for the National Alliance for Advanced Biofuels and Bio-products (NAABB) Consortium", U.S. Department of Energy, PNNL-20279, 2011, pp. 1-16.
Alonso, David M. et al., "Catalytic Conversion of Biomass to Biofuels", Green Chem., vol. 12, 2010, pp. 1493-1513.
Alonso, David M. et al., "Production of Liquid Hydrocarbon Transportation Fuels by Oligomerization of Biomass-Derived C9 Alkenes", Green Chem., vol. 12, 2010, pp. 992-999.
An, Lu et al., "The Influence of Ni Loading Coke Formation in Steam Reforming of Acetic Acid", Renewable Energy, vol. 36, 2011, pp. 930-935.
Barteau, Mark A., "Organic Reactions at Well-Defined Oxide Surfaces", Chem. Rev., vol. 96, 1996, pp. 1413-1430.
Billaud, F. et al., "Catalytic Cracking of Octanoic Acid", Journal of Analytical and Applied Pyrolysis, vol. 58-59, 2001, pp. 605-616.
Busca, Guido, "Bases and Basic Materials in Industrial and Environmental Chemistry: A Review of Commerical Processes", Ind. Eng. Chem. Res., vol. 48, 2009, pp. 6486-6511.
Catallo, W. J. et al., "Transformation of Glucose to Volatile and Semi-Volatile Products in Hydrothermal (HT) Systems", Biomass and Bioenergy, vol. 34, 2010, pp. 1-13.
Danuthai, Tanate et al., "Conversion of Methylesters to Hydrocarbons over an H-ZSM5 Zeolite Catalyst", Applied Catalyst A: General. vol. 361, 2009, pp. 99-105.
Deng, Li et al., "Upgraded Acidic Components of Bio-Oil through Catalytic Ketonic Condensation", Energy & Fuels, vol. 23, 2009, pp. 564-568.
Fu, Jie et al., "Catalytic Hydrothermal Deoxygenation of Palmitic Acid", Energy Environ. Sci., vol. 3, 2010, pp. 311-317.
Gaertner, C. A. et al., "Catalytic Coupling of Carboxylic Acids by Ketonization as a Processing Step in Biomass Conversion", Journal of Catalysis, vol. 266, 2009, pp. 71-78.
Gaertner, Christian A. et al., "Catalytic Upgrading of Bio-Oils by Ketonization", ChemSusChem, vol. 2, 2009, pp. 1121-1124.
Gaertner, Christian A. et al., "Ketonization Reactions of Carboxylic Acids and Esters over Ceria-Zirconia as Biomass-Upgrading Processes", Ind. Eng. Chem. Res, vol. 49, 2010, pp. 6027-6033.
Glinski, M. et al., "Catalytic Ketonization over Oxide Catalysts X. Transformations of Various Alkyl Heptanoates", Applied Catalysis A: General, vol. 281, 2005, pp. 107-113.
Glinski, M. et al., "Ketones from Monocarboxylic acids: Catalytic Ketonization over Oxide Systems", Applied Catalysis A: General, vol. 128, 1995, pp. 209-217.
Idem, Raphael O. et al., "Thermal Cracking of Canola Oil: Reaction Products in the Presence and Absence of Steam", Energy & Fuels . vol. 10, 1995, pp. 1150-11662.
Ignatchenko, Alexey et al., "Interaction of Water with Titania and Zirconia Surfaces", Journal of Molecular Catalysis A: Chemical, vol. 256, 2006, pp. 57-74.

(56) References Cited

OTHER PUBLICATIONS

Ignatchenko, Alexey V., "Density Functional Theory Study of Carboxylic Acids Adsorption and Enolization on Monoclinic Zirconia Surfaces", J. Phys. Chem. C., vol. 116, pp. 16012-16018.

Immer, Jeremy G. et al., "Catalytic Reaction Pathways in Liquid-Phase Deoxygenation of C18 Free Fatty Acids", Applied Catalysis A: General, vol. 375, 2010, pp. 134-139.

Kamimura, Yoichiro et al., "Synthesis of 3-Pentanone from 1-Propanol Over CeO2-Fe2O3 Catalysts", Applied catalysis A: General, vol. 252, (2003), pp. 399-410.

Kim, K.S. et al., "Pathways for Carboxylic Acid Decomposition of TiO2", Langmuir, vol. 4, 1988, pp. 945-953.

Kubicka, David et al., "Deactivation of HDS Catalysts in Deoxygenation of Vegetable Oils", Applied Catalysis A: General, vol. 394, 2011, pp. 9-17.

Kubicka, David et al., "Deoxygenation of Vegetable Oils over Sulfided Ni, Mo, and NiMo Catalysts", Applied Catalysis A: General, vol. 372, 2010, pp. 199-208.

Lusvardi, Victor S. et al., "The Effects of Bulk Titania Crystal Structure on the Adsorption and Reaction of Aliphatic Alcohols", Journal of Catalysis, vol. 153, 1995, pp. 41-53.

Madsen, Anders T. et al., "Step Changes and Deactivation Behavior in the Continuous Decarboxylation of Stearic Acid", Ind. Eng. Chem. Res., vol. 50, 2011, pp. 11049-11058.

Maher, Kelly D. et al., "Pyrolytic Decarboxylation and Cracking of Stearic Acid", Ind. Eng. Chem. Res., vol. 47, 2008, pp. 5328-5336.

Melero, Juan A. et al., "Production of Biofuels Via the Catalytic Cracking of Mixtures of Crude Vegetable Oils and Nonedible Animal Fats with Vacuum Gas Oil", Energy Fuels, vol. 24, 2010, pp. 707-717.

Murkute, Ambareesh D. et al., "Supported Mesoporous Solid Base Catalysts for Condensation of Carboxylic Acids", Journal of Catalysis, vol. 278, 2011, pp. 189-199.

Na, J. et al., "Hydrocarbon Production from Decarboxylation of Fatty Acid without Hydrogen", Catalysis Today, vol. 156, 2010, pp. 44-48.

Ooi, Yean Sang et al., "Catalytic Cracking of Used Palm Oil and Palm Oil Fatty Acids Mixture from the Production of Liquid Fuel: Kinetic Modeling", Energy & Fuels, vol. 18, 2004, pp. 1555-1561.

Palanisamy, Shanmugam et al., "Thermal Treatment of Rapeseed Oil", Bioenergy Technology, 2011, pp. 546-551.

Patel, Akshay D. et al., "Techno-Economic Analysis of 5-Nonanone Production from Levulinic Acid", Chemical Engineering Journal, vol. 1, 2010, pp. 311-321.

Pei, Z. F. et al., "On the Intermediates of the Acetic Acid Reactions on Oxides: An IR Study", Applied Surface Science, vol. 103, 1996, pp. 171-182.

Priecel, Peter et al., "The Role of Ni Species in the Deoxygenation of Rapeseed Oil Over NiMo-Alumina Catalysts", Applied Catalysis A: General, vol. 397, 2011, 127-137.

Quirino, Rafael L. et al., "Studying the Influence of Alumina Catalysts Doped with Tin and Zinc Oxides in the Soybean Oil Pyrolysis Reaction", J AM Oil Chem Soc, vol. 86, 2009, pp. 167-172.

Renz, Michael, "Ketonization of Carboxylic Acids by Decarboxylation: Mechanism and Scope", Eur. J. Org. Chem., 2005, pp. 979-988.

Response to Restriction Requirement, for U.S. Appl. No. 13/934,713, mailed Feb. 13, 2014 and filed with the USPTO May 13, 2014 (2 pages).

Serrano-Ruiz, Juan Carlos et al., "Catalytic Upgrading of Lactic Acid to Fuels and Chemicals by Dehydrations/Hydrogenation and C-C Coupling Reactions", Green Chem., vol. 11, 2009, pp. 1101-1104.

Serrano-Ruiz, Juan Carlos et al., "Catalytic Upgrading of Levulinic Acid to 5-Nonanone", Green Chem., vol. 12, 2010, pp. 574-577.

Serrano-Ruiz, Juan Carlos et al., "Transformation of Biomass-Derived Platform Molecules: From High Added-Value Chemicals to Fuels Via Aqueous-Phase Processing", Chemical Society Reviews, vol. 40, pp. 5266-5281.

Shanks, Brent H., "Conversion of Biorenewable Feedstocks: New Challenges in Heterogeneous Catalysis", Ind. Eng. Chem. Res., vol. 49, 2010, pp. 10212-10217.

Simonetti, Dante A. et al., "Catalytic Production of Liquid Fuels from Biomass-Derived Oxygenated Hydrocarbons: Catalytic Coupling at Multiple Length Scales", Catalysis Reviews, vol. 51, 2009, pp. 441-484.

Siswanto, Dessy Y. et al., "Gasoline Production from Palm Oil Via Catalytic Cracking Using MCM-41: Determination of Optimum Condition", Journal of Engineering and Applied Sciences, vol. 3, 2008, pp. 42-46.

Stefanidis, S.D. et al., "In-Situ Upgrading of Biomass Pyrolysis Vapors: Catalyst Screening on a Fixed Bed Reactor", Bioresource Technology, vol. 102, 2011, pp. 8261-8267.

Steinbusch, Kirsten J. et al., "Biological Formation of Caproate and Caprylate from Acetate: Fuel and Chemical Production from Low Grade Biomass", Energy Environ. Sci., vol. 4, 2011, p. 216.

Swaminathan, R. et al., "Studies on the Ketonization of Acetic Acid on Chromia: II. The Surface Reaction", Journal of Catalysis, vol. 16, 1970, pp. 357-362.

Tamunaidu, Pramila et al., "Catalytic Cracking of Palm Oil for the Production of Biofuels: Optimization Studies", Bioresource Technology, vol. 98, 2007, pp. 3593-3601.

Tanner, R.E. et al., "Structure and Chemical Reactivity of Adsorbed Carboxylic Acids on Anatase TiO2(001)", Surface Science, vol. 506, 2002, pp. 251-271.

Ten Dam, Jeroen et al., "Renewable Chemicals: Dehydroxylation of Glycerol and Polyols", ChemSusChem, vol. 4, 2011, pp. 1017-1034.

Twaiq, Farouq A. et al., "Liquid Hydrocarbon Fuels from Palm Oil by Catalytic Cracking Over Aluminosilicate Mesoporous Catalysts with Various Si/Al ratios", Microporous and Mesoporous Materials, vol. 64, 2003, pp. 95-107.

Vivier, Laurence et al., "Ceria-Based Solid Catalysts for Organic Chemistry", ChemSusChem, vol. 3, 2010, pp. 654-678.

Vonghia, Enrico et al., "Pathways for the Deoxygenation of Triglycerides to Aliphatic Hydrocarbons over Activated Alumina", Energy & Fuels, vol. 9, 1995, pp. 1090-1096.

Yared, Ivan et al., "Modeling of Liquid hydrocarbon Fuel Production from Palm Oil Via Catalytic Cracking Using MCM-41 as Catalyst", Journal of Engineering and Applied Sciences, vol. 3, 2008, pages.

Yean Sang, Ooi, "Biofuel Production from Catalytic Cracking of Palm Oil", Energy Sources, vol. 25, 2003, pp. 859-869.

Cheng, F W., "China Produces Fuels from Vegetable Oils", Chem. Metall. Eng. 1945, Jan. 99.

Hirata, Hirofumi et al., "Enzyme Reaction in Organic Solvent. III. Effect of Water Content and Inhibition of Alcohol for the Catalyzed Transesterification in Tributyrin 1-Octanol", Natl. Chem. Lab. Ind., vol. 38, 1989, pp. 48-52.

Lewkowitsch, J., "The Meaning of the Acetyl Value in fat Analysis", Chem. Zentr., vol. 1, 1899, pp. 375-376.

"Non-Final Office Action", for U.S. Appl. No. 13/934,713, mailed Jul. 3, 2014 (31 pages).

"Final Office Action," for U.S. Appl. No. 13/934,713, mailed Feb. 2, 2015 (19 pages).

"International Preliminary Report on Patentability," for PCT Application No. PCT/US2013/049250, mailed Jan. 15, 2015 (8 pages).

"Non-Final Office Action," for U.S. Appl. No. 13/934,713 mailed Jul. 24, 2015 (20 pages).

"Response to Non-Final Office Action," for U.S. Appl. No. 13/934,713, mailed Jul. 24, 2015 and filed with the USPTO Nov. 24, 2015 (9 pages).

\* cited by examiner

| Exp. # | Biomass Type | Catalyst | Preheater Temp. (oC) | Reactor Temp. (oC) | Back Pressure (PSI) | Water Flow Rate (mL/min) | Oil Flow Rate (mL/min) | Contact Time (min) | Biofuel Layer (g/min) | Liquid biofuel % (mass) | % Biofuel (GC/MS) | Selectivity |
|---|---|---|---|---|---|---|---|---|---|---|---|---|
| 1 | Oleic Acid | Zirconia | 493 | 501 | 3600 | 5.60 | 1.65 | 1.01 | 1.09 | 73% | 95% | 69% |
| 2 | Oleic Acid | Zirconia | 548 | 552 | 3500 | 5.60 | 1.65 | 1.01 | 0.57 | 38% | 100% | 38% |
| 3 | Camelina | Zirconia | 520 | 502 | 3500 | 5.80 | 2.06 | 0.95 | 1.26 | 67% | 100% | 67% |
| 4 | Camelina | Zirconia | 553 | 538 | 3700 | 5.80 | 2.06 | 0.93 | 1.00 | 53% | 99% | 53% |
| 5 | Distiller's Corn Oil | Zirconia | 500 | 500 | 3500 | 5.80 | 1.66 | 1.00 | 1.19 | 79% | 77% | 60% |
| 6 | Distiller's Corn Oil | Zirconia | 550 | 550 | 3500 | 5.80 | 1.66 | 1.00 | 0.70 | 46% | 99% | 46% |
| 7 | Jatropha | Zirconia | 500 | 501 | 3500 | 6.00 | 2.06 | 1.00 | 1.45 | 77% | 96% | 74% |
| 8 | Jatropha | Zirconia | 550 | 550 | 3500 | 6.00 | 2.06 | 1.00 | 1.09 | 58% | 97% | 56% |
| 9 | Soybean Oil | Zirconia | 495 | 495 | 3550 | 5.80 | 2.06 | 1.00 | 1.41 | 75% | 98% | 74% |
| 10 | Soybean Oil | Zirconia | 515 | 515 | 3550 | 5.80 | 2.06 | 1.00 | 1.30 | 70% | 99% | 69% |
| 11 | Soybean Oil | Zirconia | 550 | 550 | 3500 | 5.80 | 2.06 | 1.00 | 0.88 | 47% | 100% | 47% |
| 12 | Soybean Oil | Zirconia | 600 | 600 | 3500 | 5.80 | 2.06 | 1.00 | 0.55 | 30% | 100% | 30% |
| 13 | Algae Oil | Zirconia | 503 | 501 | 3500 | 5.80 | 2.06 | 0.95 | 1.44 | 77% | 87% | 67% |
| 14 | Algae Oil | Zirconia | 552 | 549 | 3500 | 5.80 | 2.06 | 0.95 | 0.92 | 59% | 100% | 59% |
| 15 | Soybean Oil | NONE | 504 | 501 | 3500 | 5.73 | 1.80 | 0.97 | 1.07 | 72% | 57% | 41% |
| 16 | Soybean Oil | NONE | 552 | 551 | 3500 | 5.73 | 1.56 | 1.00 | 0.72 | 51% | 77% | 39% |
| 17 | Soybean Oil | Alumina | 500 | 500 | 3500 | 5.80 | 2.06 | 1.00 | 1.57 | 85% | 41% | 35% |
| 18 | Soybean Oil | Alumina | 550 | 550 | 3500 | 5.80 | 2.06 | 1.00 | 0.85 | 46% | 96% | 44% |
| 19 | Soybean Oil | Titania | 500 | 500 | 3500 | 5.80 | 2.06 | 1.00 | 1.44 | 78% | 81% | 63% |
| 20 | Soybean Oil | Titania | 550 | 550 | 3500 | 5.80 | 2.06 | 1.00 | 0.97 | 52% | 100% | 52% |

FIG. 7

HYDROCARBON SYNTHESIS METHODS, APPARATUS, AND SYSTEMS

This application is a continuation-in-part of U.S. patent application Ser. No. 13/934,713, filed Jul. 3, 2013, which claims the benefit of U.S. Provisional Application No. 61/667,813, filed Jul. 3, 2012, U.S. Provisional Application No. 61/680,360, filed Aug. 7, 2012 and U.S. Provisional Application No. 61/702,582, filed Sep. 18, 2012, the contents of all of which are herein incorporated by reference.

FIELD OF THE INVENTION

The present invention relates to apparatus and systems for hydrocarbon synthesis and methods regarding the same.

BACKGROUND OF THE INVENTION

Many chemical building blocks and energy sources are derived from fossil carbon deposits that are extracted from the earth's crust in the form of crude petroleum, coal, or natural gas. These fossil carbon deposits range from materials with low carbon to hydrogen ratios such as methane to those that are nearly pure carbon, such as certain types of coal. Fossil carbon sources are viewed as being non-renewable because it is estimated that such deposits take millions of year to form through slow anaerobic decomposition of buried organic matter in combination with exposure to heat and pressure.

World energy consumption is expanding at a rate of over 2% per year. In addition, the demand for products that are made from materials (including many types of polymers) derived from fossil carbon sources continues to increase at an accelerating pace. As such, while the total amount of fossil carbon deposits continues to change as new deposits are discovered, the amount remaining for further exploitation (whether currently known or unknown) necessarily decreases at an accelerating pace.

In addition, most uses of fossil carbon sources lead to a net increase in the amount of carbon in the atmosphere (usually in the form of carbon dioxide) because the cycle starts with carbon that is safely sequestered in the earth's crust and ends with carbon in the atmosphere. This is significant because carbon dioxide has been identified as a key contributor to global warming.

In addition, fossil carbon sources are not evenly distributed within the earth's crust. Some geographic areas are relatively rich in fossil carbon sources while others are relatively poor in fossil carbon sources. In some cases, certain areas may have a substantial amount of one form of fossil carbon but be substantially deficient in other forms. This uneven distribution results in substantial geopolitical stress as countries that are deficient in such essential resources sometimes find that they are at the economic mercy of countries that are rich in such resources.

Utilizing carbon from renewable sources such as organic matter can reduce carbon emissions substantially on a net lifecycle basis because the carbon in emissions from the combustion of renewable carbon sources is from carbon that was previously already in the atmosphere and incorporated into organic materials, rather than being permanently sequestered in the earth's crust.

However, carbon from renewable sources generally does not exist in the same forms as fossil carbon sources and this creates issues. For example, the energy and chemical production infrastructure of most nations has been built up to use fossil carbon sources and cannot be easily changed over to rely on renewable sources. In addition, the same range of compounds found in fossil carbon sources is generally not observed in most renewable carbon sources.

SUMMARY OF THE INVENTION

Embodiments of the invention include apparatus and systems for hydrocarbon synthesis and methods regarding the same. In an embodiment, the invention includes a method for creating a hydrocarbon product stream comprising reacting a reaction mixture in the presence of a catalyst inside of a reaction vessel to form a product mixture, the reaction mixture comprising a carbon source and water. The temperature inside the reaction vessel can be between 450 degrees Celsius and 600 degrees Celsius and the pressure inside the reaction vessel can be above supercritical pressure for water.

In an embodiment, the invention includes an extrusion reactor system for creating a hydrocarbon product stream. The extrusion reactor system can include an extrusion reactor housing comprising an input port and an output port; an extrusion screw disposed within the extrusion reactor housing; a temperature control system configured to maintain the temperature inside the extrusion reactor housing between 450 degrees Celsius and 600 degrees Celsius; and a catalyst disposed within the extrusion reactor housing. Pressure inside the extrusion reactor system can be above supercritical pressure for water.

In an embodiment, the invention includes a reactor system for creating a hydrocarbon product stream. The reactor system can include a reactor housing comprising an input port and an output port; a temperature control system configured to maintain the temperature inside the extrusion reactor housing between 450 degrees Celsius and 600 degrees Celsius; and a catalyst disposed within the reactor housing. The pressure inside the reaction vessel can be above supercritical pressure for water.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope of the present invention is defined by the appended claims and their legal equivalents.

BRIEF DESCRIPTION OF THE FIGURES

The invention may be more completely understood in connection with the following drawings, in which:

FIG. 7 is a chart of experimental conditions of continuous biofuel production in accordance with various embodiments herein.

Figure 1:
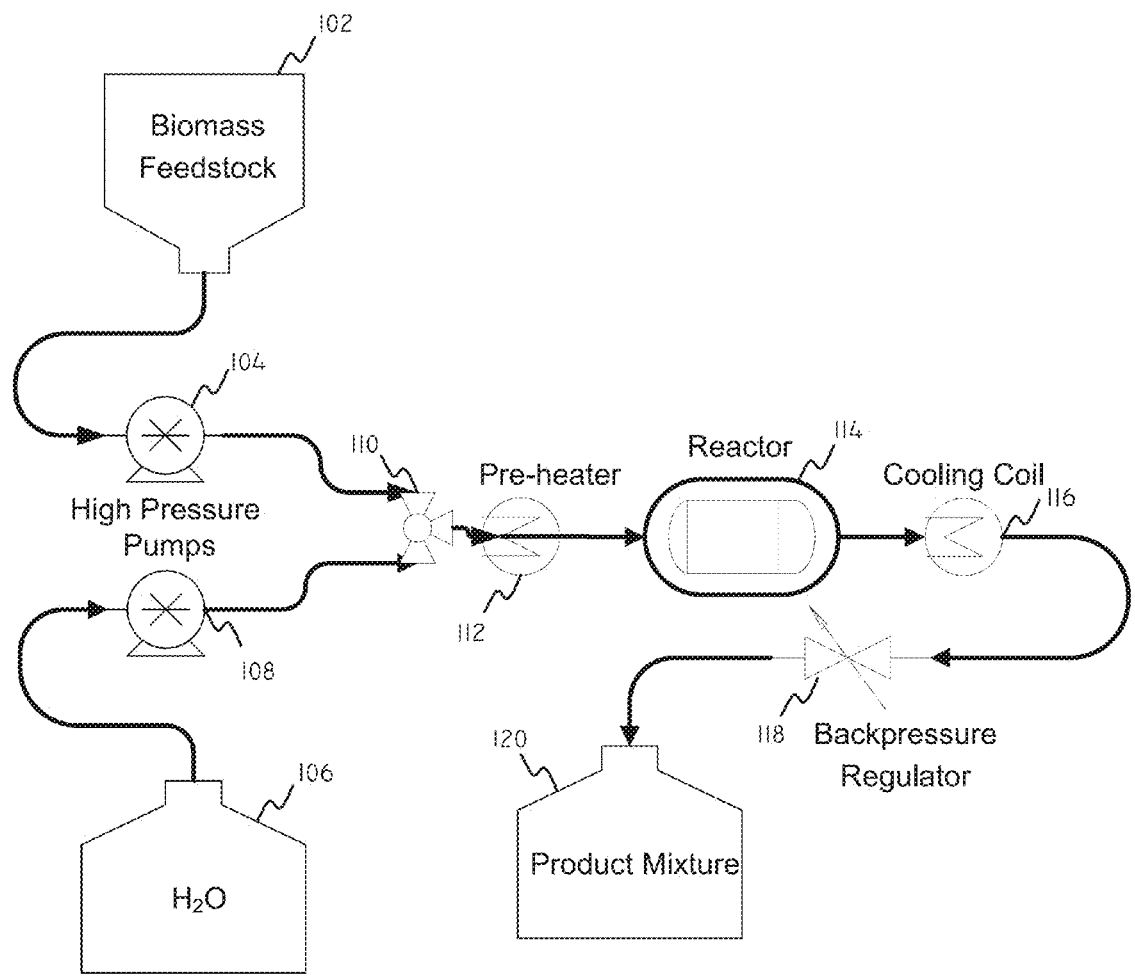
FIG. 1 is a schematic diagram of a reactor system in accordance with various embodiments herein.

While the invention is susceptible to various modifications and alternative forms, specifics thereof have been shown by way of example and drawings, and will be described in detail. It should be understood, however, that the invention is not limited to the particular embodiments described. On the contrary, the intention is to cover modifications, equivalents, and alternatives falling within the spirit and scope of the invention.

DETAILED DESCRIPTION OF THE INVENTION

The embodiments of the present invention described herein are not intended to be exhaustive or to limit the invention to the precise forms disclosed in the following detailed description. Rather, the embodiments are chosen and described so that others skilled in the art can appreciate and understand the principles and practices of the present invention.

All publications and patents mentioned herein are hereby incorporated by reference. The publications and patents disclosed herein are provided solely for their disclosure. Nothing herein is to be construed as an admission that the inventors are not entitled to antedate any publication and/or patent, including any publication and/or patent cited herein.

Embodiments herein can be used to convert renewable carbon sources into forms similar to non-renewable carbon sources. By way of example, embodiments herein can be used to convert renewable carbon sources into fossil fuel equivalents for engines, including external combustion engines and internal combustion engines (including both intermittent and continuous combustion engines). As a specific example, embodiments herein can be used to produce fuel for two-stroke engines, four-stroke engines, compression-ignition engines, gas turbine engines, and jet engines.

In addition, embodiments herein can be used to convert renewable carbon sources into hydrocarbon compounds useful as chemical building blocks. By way of example, embodiments herein can be used to convert renewable carbon sources into bio-petroleum compounds such as alkanes, alkenes, olefins, aromatics and combinations of these.

In addition, embodiments herein can be used to convert a one form of a non-renewable carbon material into a different form of non-renewable carbon material. By way of example, embodiments herein can be used to convert various types of coal into other forms of hydrocarbon such as products that are equivalent to petroleum, the various materials that can be derived there from, and/or fractions of petroleum.

Embodiments herein can be used to perform various reactions. Reaction can include, but are not limited to, those illustrated in reaction diagrams (I), (II), and (III) below (wherein (I) illustrates the reaction of a triglyceride, (II) illustrates the reaction of a carboxylic acid, and (III) illustrates the reaction of cellulose):

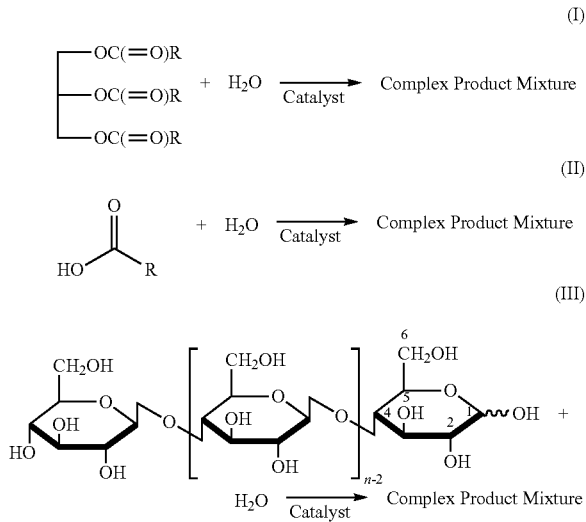

It will be appreciated, however, that reactions here are not limited to these starting materials (provided by way of example) and can include a wide variety of feedstock materials. Other specific bioorganic starting materials can include, but are not limited to, proteins, amino acids, alcohols, nucleic acids, phospholipids, other lipids, saccharides, disaccharides, polysaccharides, lignin, chitin, and the like.

The products of reactions herein can include alkanes, alkenes, ketones, aromatics, polyaromatics, and various gases. Alkanes formed in various embodiments herein can include, but are not limited to, methane, ethane, propane, butane, pentane, heptane, octane, nonane, decane, dodecane, and tridecane. Alkenes formed in various embodiments herein can include, but are not limited to, 1-butene, 1-pentene, 1-heptene, 2-octene, 1-nonene, 4-decene, 5-undecene, 1-hexadecene. Ketones formed in various embodiments herein can include, but are not limited to, 3-octanone, 3-nonanone, 2-decanone, 2-heptadecanone, 2-heptadecanone, 3-octadecanone, 2-nonadecanone, 5-tridecanone, and 6-undecanone. Aromatics formed in various embodiments herein can include, but are not limited to, benzene, toluene, and xylene. Gases formed in various embodiments herein can include, but are not limited to, $H_2$, $CO$, and $CO_2$.

In some embodiments, the product mixture of reactions herein includes at least about 0 to 40% ketones (as measured by GC-MS chromatographic peak area normalization method). In some embodiments, the product mixture includes at least about 1 to 40% ketones. In some embodiments, the product mixture includes greater than 0%, 1%, 2%, 3%, 4%, 5%, 10%, 15%, 20%, 25%, 30%, 35%, or 40% ketones.

In some embodiments, the product mixture includes at least about 20% aromatics (as measured by GC-MS chromatographic peak area normalization method). In some embodiments, the product mixture includes at least about 30% aromatics. In some embodiments, the product mixture includes greater than 0%, 1%, 2%, 3%, 4%, 5%, 10%, 15%, 20%, 25%, 30%, 35%, or 40% aromatics.

In some embodiments, the product mixture includes at least about 10% olefins (as measured by GC-MS chromatographic peak area normalization method). In some embodiments, the product mixture includes at least about 20% olefins. In some embodiments, the product mixture includes at least about 30% olefins. In some embodiments, the product mixture includes at least about 40% olefins. In some embodiments, the product mixture includes greater than 0%, 1%, 2%, 3%, 4%, 5%, 10%, 15%, 20%, 25%, 30%, 35%, or 40% olefins.

In various embodiments, the balance of the product mixture can include aliphatic compounds and free acids (e.g., carboxylic acids, such as fatty acids). In various embodiments, the product mixture includes less than about 15% free acids (as measured by GC-MS chromatographic peak area normalization method). In various embodiments, the product mixture includes less than about 10% free acids. In various embodiments, the product mixture includes less than about 5% free acids. In various embodiments, the product mixture includes less than about 4% free acids. In various embodiments, the product mixture includes less than about 3% free acids. In various embodiments, the product mixture includes less than about 2% free acids. In various embodiments, the product mixture includes less than about 1% free acids.

In some embodiments, the product mixture can include from about 10 to about 20 percent aliphatics, from about 25 to about 50 percent olefins, from about 10 to about 40 percent aromatics, and from about 10 to about 25 percent ketones (as measured by GC-MS chromatographic peak area normalization method).

The embodiments herein are quite distinct from other chemical processes. By way of example, pyrolysis is a process of converting organic materials into other forms. The key feature of pyrolysis is the removal of oxygen from the system to circumvent combustion. As such, normal pyrolysis is usually performed in a nitrogen atmosphere under very high temperatures. Vacuum pyrolysis is performed in a similar manner to normal pyrolysis, except the inert atmospheres is achieved by removal of pressure from the system. Typically, pyrolysis product streams are characterized by an aqueous phase, a bio-oil phase and a gaseous stream (often referred to as non-condensables). The bio-oil liquid phase is typically composed of acidic compounds, oxygenates, and phenols. Most bio-oils require a second processing step to make them useful as fuels because of their inherent instability. Hydrogenation (often called hydrodeoxygenation) is usually the preferred method of upgrading. The other methods commonly used are gasification of the bio-oil through cracking or steam reforming and emulsification with a petroleum fuel.

Pyrolysis is often performed to effect the total gasification of a substrate. That gas stream is then separated into hydrocarbon components and syn-gas components. The syn-gas stream can then be processed by methods such as Fischer-Tropsch chemistry to yield hydrocarbons.

In general, water is viewed as problematic to pyrolysis. It increases the amount of energy required to heat the feedstock to the appropriate temperatures. As such, most biomass inputs are subjected to drying before entering a pyrolysis reactor.

Embodiments herein differ substantially from pyrolysis in many regards. Embodiments herein can use water as both a solvent and reactant. Further, the pressures of many embodiments herein are much higher and the temperatures are generally low for pyrolytic techniques. In addition, the product stream obtained herein when using triglyceride based oils is deoxygenating, which is not consistent with a pyrolysis process. For these and other reasons, embodiments herein are substantially different than pyrolysis.

Another process referred to as steam reforming is characterized by total gasification of biomass in the presence of superheated water (700-1000 degrees Celsius), but under normal pressures (3-25 bar). Steam reforming is typically used to produce hydrogen gas from methane. With the proper temperatures and catalyst, methane is converted to carbon monoxide and hydrogen gas in the presence of water. Furthermore, the carbon monoxide equivalent produced undergoes a water-gas shift to produce a third equivalent of hydrogen. The vast majority of hydrogen gas in the US is produced by reforming of methane.

Embodiments herein differ substantially from steam reforming techniques in terms of temperatures, pressure, residence times, and product mixtures obtained.

Hydrothermal cracking is another process for the treatment of oil, biomass and crude petroleum mixtures. It is characterized by a reaction of the incoming feedstock stream with hydrogen gas. Reactions are conducted under moderate to high pressure (14-4000 psi) and at a range of temperatures (100-500 degrees Celsius). There are a variety of catalysts that effect this transformation. In general this results in the reduction of most functional groups in the mixtures and results in the production of mostly saturated hydrocarbon constituents. In terms of biomass related materials this process may also be called hydrodeoxygenation. This process is responsible for the removal of sulfur and nitrogen as well in the form of $H_2S$ and ammonia, respectively. Partial cracking versus total cracking can be identified by cracking pressure. The higher the pressure the more aggressive the reduction is, i.e. reducing aromatics to cycloalkanes.

However, embodiments herein differ substantially from hydrothermal cracking at least in the lack of hydrogen as a co-reactant and the addition of water.

Catalytic cracking processes include fluid catalytic cracking (FCC) or thermal cracking. Typically, feedstock streams are petroleum based long chain hydrocarbons. The FCC system passes a hot mixture over a much hotter bed of catalyst (700-1000 degrees Celsius) resulting it fragmentation of the larger molecules to give an array of lighter compounds—gasolines, naphthas, olefins. This is performed at or very near atmospheric pressures.

Embodiments herein differ substantially from catalytic cracking in the use of higher pressures, lower temperatures, and the use of water as a co-reactant.

The properties of water change greatly with temperature and pressure. At sub-critical temperatures the Kw of water continues to increase making water a more aggressive amphoteric solvent. While the dielectric constant is decreasing as temps are increased, the solvating power of water at sub-critical temps is increased for polar molecules like celluloses. The increased Kw also allows water to act in acid/base capacities more aggressively. That is, hydrolytic rates increase greatly, as well as elimination reactions, condensations and other general acid/base catalyzed reactions. Supercritical water displays very different properties. As water nears its supercritical temperature the dielectric constant continues to decrease and Kw sees a very rapid drop as well. Above supercritical temperatures water behaves like a nonpolar solvent. It becomes miscible with oils and hydrocarbons and many salts become completely insoluble.

The method of embodiments herein is unique in many ways including that it utilizes a very active catalyst that is capable of performing multiple reactions. Specifically, triglycerides are hydrolyzed, ketonized, and fragmented to hydrocarbons. Other processes do not directly hydrolyze triglycerides under supercritical water conditions and then simultaneously convert the hydrolyzed free fatty acids to petroleum stream products. Depending on the feedstock and its olefinic content, large amounts of aromatics can be formed by methods herein. In some embodiments, product steams can include at least about 10 aromatics.

Embodiments herein can achieve both sub-critical hydrolysis and reaction of the resulting fatty acids with a specific decarboxylation or ketonization catalyst in a single step with a regenerable catalyst. Significantly, for the subsequent chemistries taking place beyond hydrolysis the removal of water is unnecessary. While not intending to be bound by theory, in some embodiments water can be pivotal for some of the chemistries occurring beyond hydrolysis.

Embodiments herein can include specific and selective chemical transformations (hydrolysis to FFAs, FFAs to ketones). As such, this stands in contrast to random bond breakage due to thermal autodecomposition (cracking)

Methods and Reaction Conditions

Methods herein can include a method for creating a hydrocarbon product streams. The method can include reacting components of a reaction mixture in the presence of a catalyst to form a product mixture. The reaction mixture can include a carbon source and water. The reaction can take place inside a reaction vessel.

Applicants have discovered that the reaction can fail to result in some desirable products if the temperature is not sufficiently high. In some embodiments, the temperature is greater than the critical temperature for water. In some embodiments, the reaction is carried out at about 374° Celsius or hotter. In some embodiments, the reaction is carried out at about 400° Celsius or hotter. In some embodiments, the reaction is carried out at about 450° Celsius or higher. In some embodiments, the reaction is carried out at about 500° Celsius or higher. In some embodiments, the reaction is carried out at about 515° Celsius or higher. In some embodiments, the reaction is carried out at about 530° Celsius or higher. In some embodiments, the reaction is carried out at about 540° Celsius or higher.

If the temperature is too high, the reaction products will simply decompose with random bond breaking as a result of thermal decomposition. In some embodiments, if the temperature is too high the mix of product might shift to a less desirable mixture. In some embodiments, the reaction is carried out at a temperature of less than about 700° Celsius. In some embodiments, the reaction is carried out at a temperature of less than about 650° Celsius. In some embodiments, the reaction is carried out at a temperature of less than about 600° Celsius. In some embodiments, the reaction is carried out at a temperature of less than about 580° Celsius. In some embodiments, the reaction is carried out at a temperature of less than about 560° Celsius.

In some embodiments, the reaction is carried out between about 400° Celsius and about 700° Celsius. In some embodiments, the reaction is carried out between about 450° Celsius and about 700° Celsius. In some embodiments, the reaction is carried out between about 400° Celsius and about 650° Celsius. In some embodiments, the reaction is carried out between about 450° Celsius and about 600° Celsius. In some embodiments, the reaction is carried out between about 500° Celsius and about 600° Celsius. In some embodiments, the reaction is carried out between about 500° Celsius and about 550° Celsius. In some embodiments, the reaction is carried out between about 500° Celsius and about 540° Celsius. In some embodiments, the reaction is carried out between about 500° Celsius and about 530° Celsius. In some embodiments, the reaction is carried out between about 510° Celsius and about 540° Celsius. In some embodiments, the reaction is carried out between about 510° Celsius and about 530° Celsius. In some embodiments, the reaction is carried out between about 510° Celsius and about 520° Celsius.

In an embodiment, the pressure is greater than about 500 psi. In an embodiment, the pressure is greater than about 800 psi. In an embodiment, the pressure is greater than about 1000 psi. In an embodiment, the pressure is greater than about 1500 psi. In an embodiment, the pressure is greater than about 2000 psi. In an embodiment, the pressure is greater than about 3000 psi. In an embodiment, the pressure is greater than about 3000 psi. In an embodiment, the pressure is greater than about 4000 psi. In some embodiments, the pressure is between about 1500 psi and about 5000 psi. In some embodiments, the pressure during the reaction is greater than the critical pressure of water (221.2 bar or 3205 psi).

In an embodiment, the contact time is between about 0.1 seconds and 2 hours. In an embodiment, the contact time is between about 1 second and 20 minutes. In an embodiment, the contact time is between about 2 seconds and 1 minute.

The amount of water used in the reactant mixture can vary. In some embodiments, the ratio of water to the carbon source (such as lipid) is at least about 1:1 on a mass basis. In some embodiments, the ratio of water to the carbon source is at least about 2:1. In some embodiments, the ratio of water to the carbon source is at least about 3:1. In some embodiments the reaction mixture includes at least about 50% water by mass. In some embodiments the reaction mixture includes at least about 66% water by mass. In some embodiments the reaction mixture includes at least about 75% water by mass.

Reactor Systems

Referring now to FIG. 1, a schematic view of a basic reactor is presented in accordance with an embodiment of the invention. In this embodiment, a feedstock, such as a biomass feedstock is held in a first feedstock tank 102 or bin. Various examples of biomass feedstocks are described in greater detail below. However, it will be appreciated that the scope of biomass feedstocks contemplated for use herein is quite broad and therefore the listing is being provided only by way of non-limiting example. A co-reactant, such as water, is held in a second feedstock tank 106. One or both of the feedstock tanks can be continuously sparged with an inert gas such as nitrogen to remove dissolved oxygen from the respective feedstock. While this embodiment of a reactor setup includes two separate feedstock tanks, it will be appreciated that in some embodiments only a single feedstock tank can be used and the reactants can be combined together within the single feedstock tank.

The feedstocks then pass from the first feedstock tank 102 and second feedstock tank 106 through pumps 104 and 108, respectively, before being combined and passing through a heat exchanger (not shown) where the feedstocks absorb heat from downstream products. The mixture then passes through a shutoff valve 110 and, optionally, a filter (not shown). The feedstock mixture then passes through a preheater 112 and through a reactor 114 where the feedstock mixture is converted into a product mixture. The reactor can include a catalyst, such as in the various forms described herein. In some embodiments, the catalyst is in the form of a particulate and it is packed within the reactor. In some embodiments, however, the catalyst can be mixed in with the feedstock and then passed into a reaction chamber that does not include a packed catalyst.

The reaction product mixture can pass through the heat exchanger (not shown) in order to transfer heat from the effluent reaction product stream to the feedstock streams. In some embodiments, the reaction product mixture can pass through a cooling coil 116. The liquid reaction product mixture can also pass through a backpressure regulator 118 before passing on to a liquid reaction product storage tank 120.

It will be appreciated that various other processes can be performed on the product mixture. By way of example, a lipid phase can be separated from a phase that includes a product mixture. In some embodiments, various products can be separated from one another using distillation techniques. In some embodiments, the reaction products can be isolated from one another and then subjected to further reaction steps.

Figure 2:
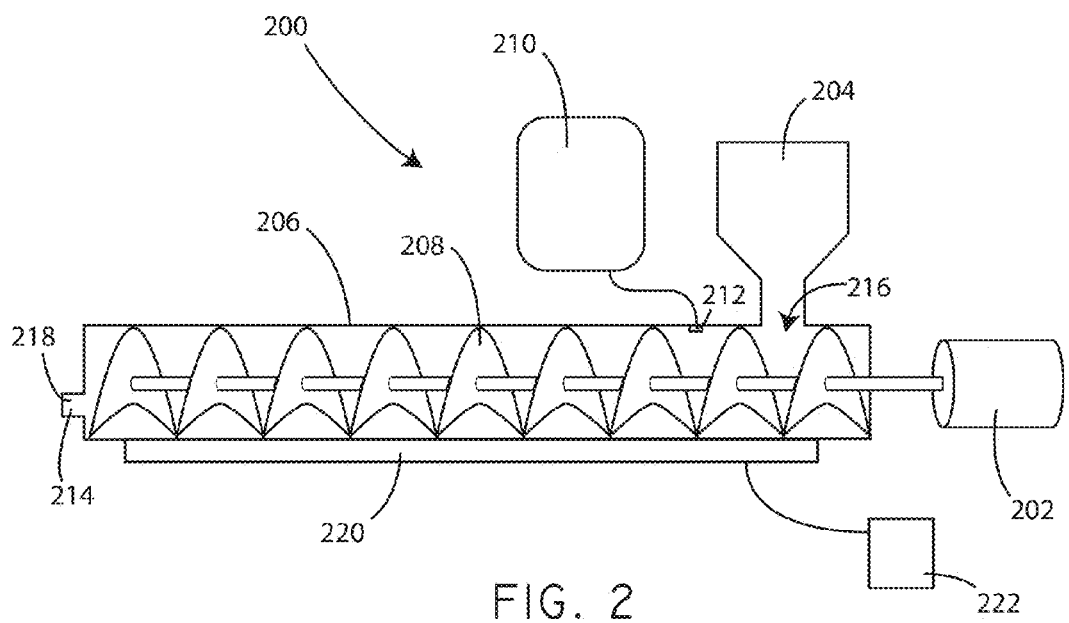
FIG. 2 is a schematic diagram of an extrusion system in accordance with various embodiments herein.

In some embodiments, the carbon feedstock can be subjected to an extrusion process. Referring now to FIG. 2, a schematic diagram is shown of an extrusion reactor 200 in accordance with an embodiment of the invention. The reactor 200 includes an extrusion reactor housing 206 defining an input port 216 and an output port 218. A hopper 204 is configured to hold a feedstock and deliver it into the reactor housing 206 through the input port 216. The feedstock is conveyed and mixed by an extrusion screw 208. The extrusion screw 208 or auger is rotated by a motor 202.

Various additives can be inserted into the reactor housing 206. For example, additives can be stored in an additive tank 210 and then injected into the reactor housing 206 through an additive injection port 212. Additives can include catalysts, water, surfactants, acids or bases, carrier compounds, or the like. In some embodiments, the additives can simply be mixed with the feedstock before entering the input port 216 such as when in the hopper 204 or prior to entering the hopper 204.

In some embodiments, a temperature control system (including, for example, heating element 220 and controller 222) can be disposed along the reactor housing 206 in order to maintain the interior of the reactor housing at a given temperature. In some embodiments, a preheater (not shown) can be disposed along the hopper 204 in order to heat the feedstock to a desired temperature before it enters the reactor housing 206.

The reactor 200 is configured to allow the feedstock stream to interact with a catalyst. In some embodiments, a catalyst can be embedded in the walls of the reactor housing 206. In some embodiments, a catalyst can be embedded on the surfaces of the extrusion screw 208. In some embodiments, a particulate catalyst is added to the feedstock before entering the reactor housing 206 and, optionally, later recovered after passing through the reactor housing 206.

The extrusion screw 208 rotates and moves the feedstock through the reactor housing 206 toward the output port 218. Pressure and, as a result, temperature are increased as the feedstock is pushed on by the extrusion screw 208. The reaction product stream passes out of the reactor housing 206 and then through an extrusion die 214.

Though not shown in FIGS. 1-2, in some embodiments, feedstocks can be subjected to one or more preprocessing steps before being processed in a reactor. For example, a feedstock can be subject to mechanical processing in order to render the matter therein more suitable for reaction. In some embodiments, the feedstock may be mechanically processed to yield a relatively fine particulate feedstock. By way of example, mechanical processing can include operations of cutting, chopping, crushing, grinding, or the like. In some embodiments, other types of processing procedures can be performed such as the addition of water, or other additives, to the feedstock.

Figure 3:
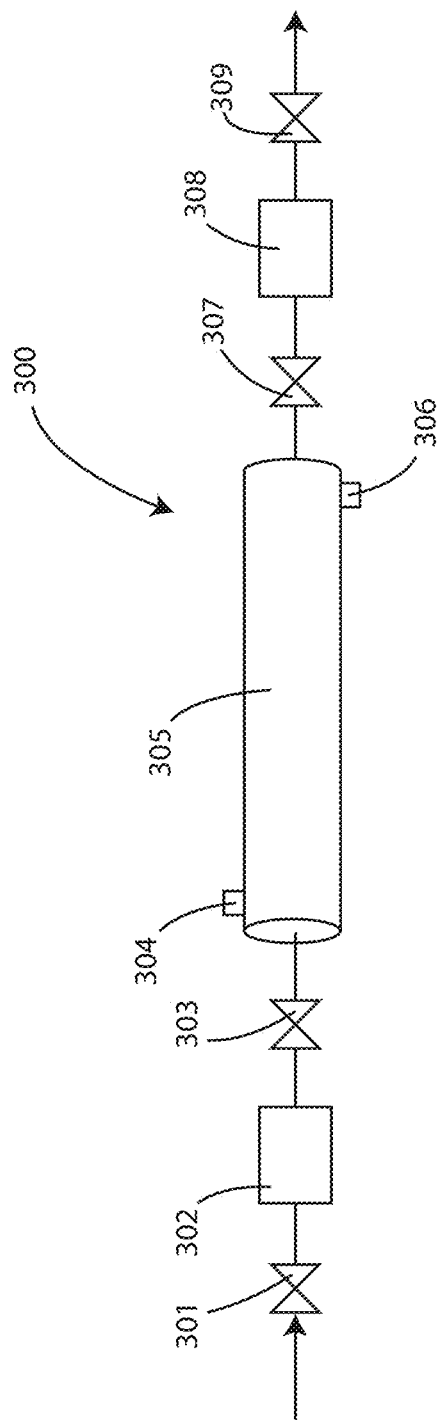
FIG. 3 is a schematic diagram of an extraction system in accordance with various embodiments herein.

In some embodiments, a feedstock may be subjected to an extraction operation before contacting a catalyst. For example, a feedstock can be subjected to a supercritical fluid extraction operation. One example of a supercritical fluid extraction apparatus is described in U.S. Pat. No. 4,911,941, the content of which is herein incorporated by reference. Referring now to FIG. 3, an extraction system 300 is shown in accordance with an embodiment of the invention. At steady state conditions, the extraction vessel 305 is filled with a raw feedstock material that contains carbon source material. A supercritical fluid is fed to the first end 304 of the extraction vessel 305 and feedstock-containing supercritical fluid is withdrawn from the second end 306 of the extraction vessel 305. In an embodiment, the supercritical fluid is supercritical water. In an embodiment, the supercritical fluid is carbon dioxide. Raw feedstock material is periodically admitted through valve 301 into blow case 302. Valves 303 and 307 are simultaneously opened intermittently so as to charge the raw feedstock from blow case 302 to the second end of the extraction vessel 306 and discharge a portion of processed feedstock waste from the first end 304 of the extraction vessel 305 to blow case 308. Valves 303 and 307 are then closed. Valve 309 is then opened to discharge the processed feedstock waste from blow case 308. Additional raw feedstock is admitted through valve 301 into blow case 302 and the procedure is repeated. The extraction system 300 can be connected in series with a reactor. For example, the extraction system 300 can be connected in series with the reactor shown in FIG. 1 or FIG. 2.

In some embodiments, a reactor including staged temperatures can be utilized. For example, reactants can first be exposed to a particular temperature level for a period of time in the presence of a first catalyst, then can pass onto further reaction stages at a different temperature in the present of the same or a different catalyst. For example, the reactor can include one or more lower temperature reaction stages followed by a last reaction stage at between 500 degrees Celsius and 550 degrees Celsius. The lower temperature preliminary reaction stages can be at either supercritical or subcritical temperatures for water.

Figure 4:
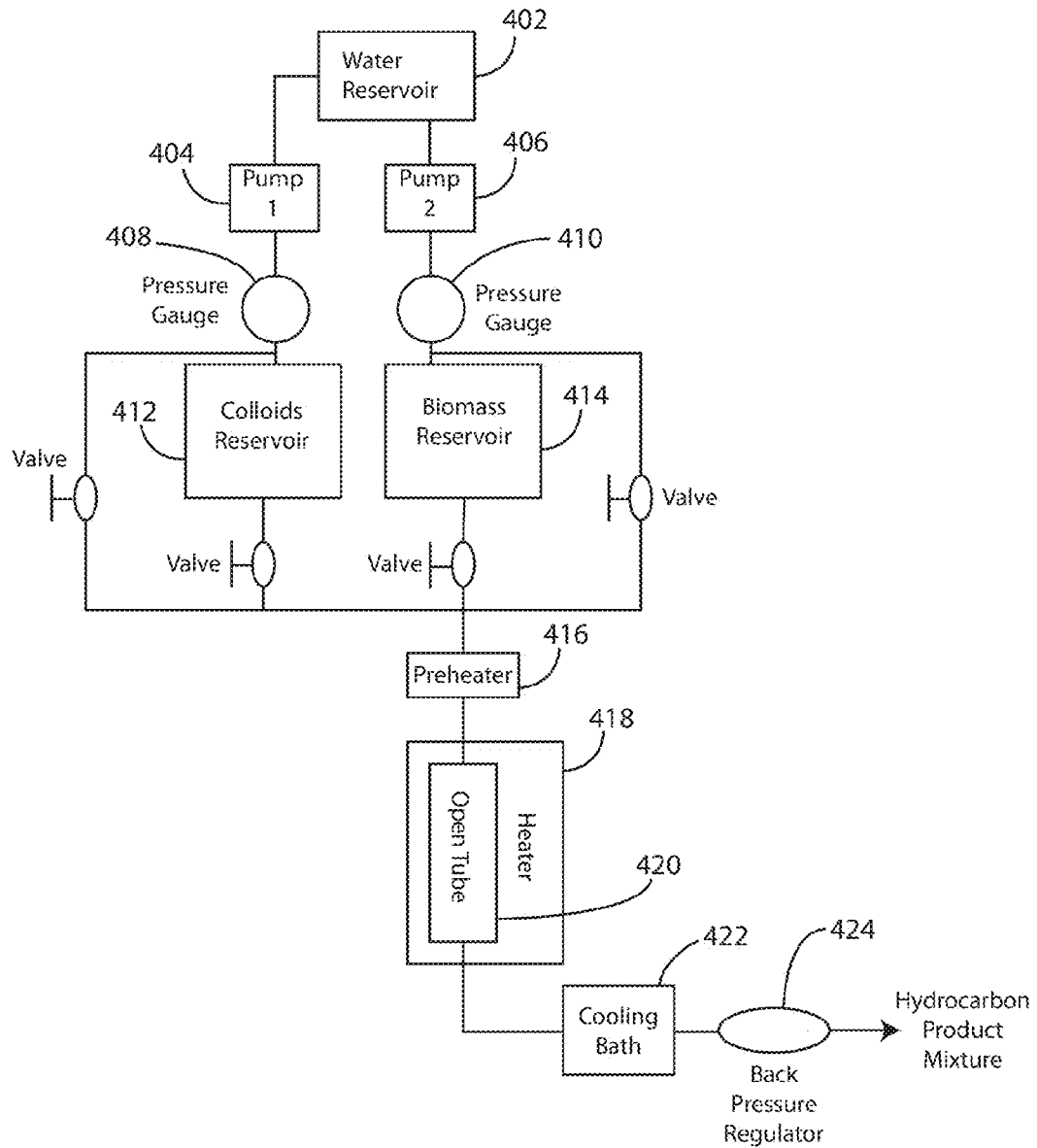
FIG. 4 is a block diagram of an open tube hydrocarbon production system.
Figure 5:
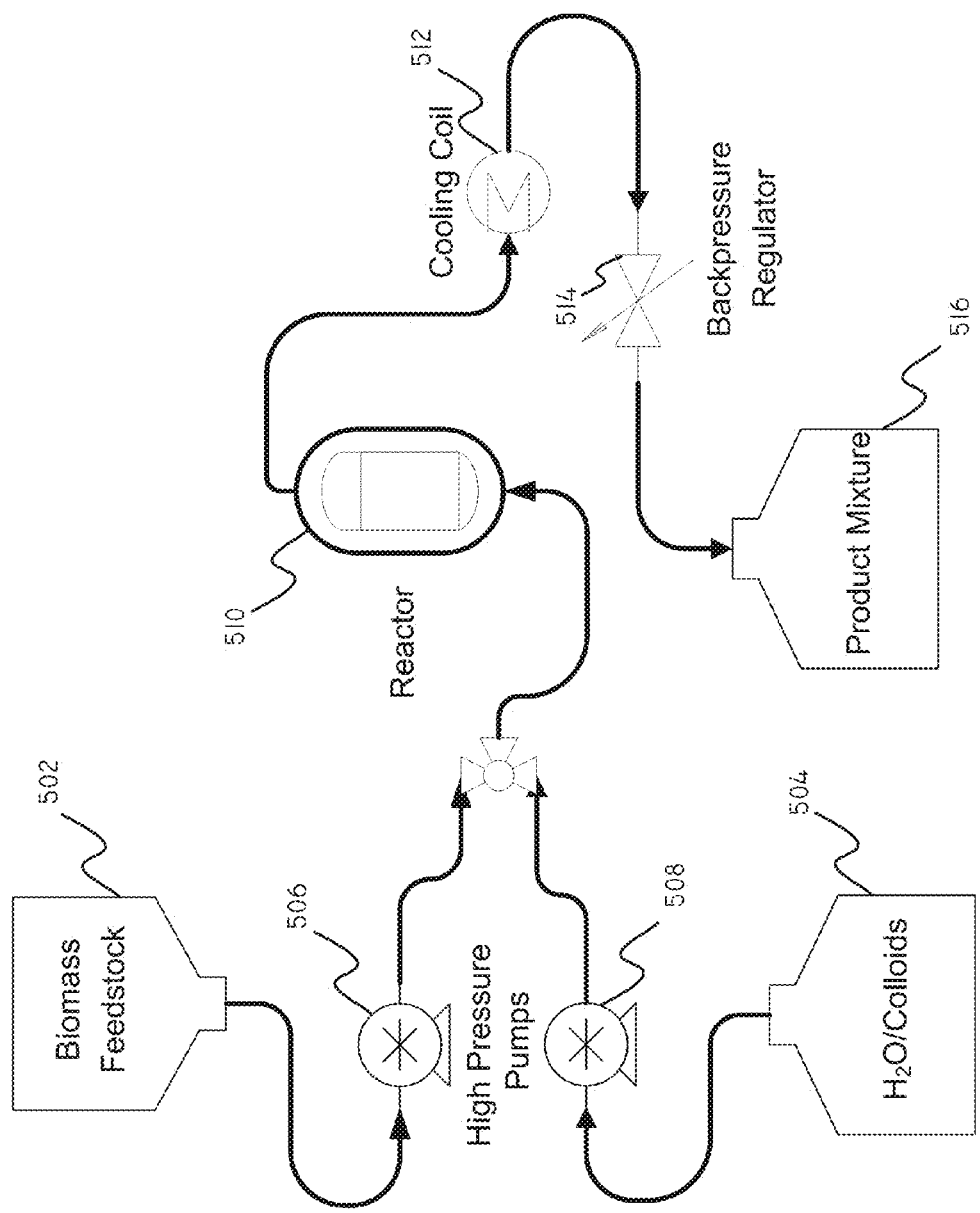
FIG. 5 is a schematic view of a reactor system in accordance with various embodiments herein.
Figure 6:
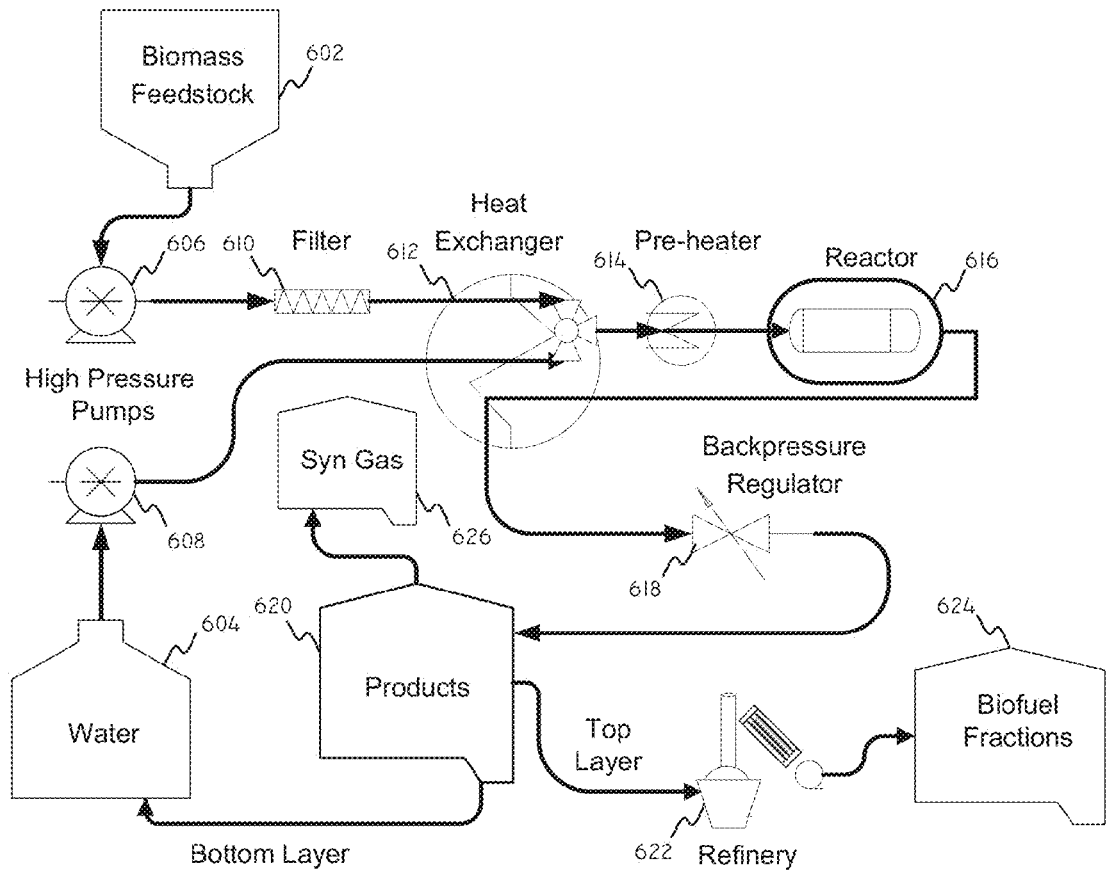
FIG. 6 is a schematic view of a system in accordance with various embodiments herein.

It will be appreciated that many other specific reactor configurations are within the scope described herein. By way of example, additional reactor configurations are shown in FIGS. 4, 5 and 6. FIG. 4 is one example of a reactor system that can be used in conjunction with embodiments herein. The reactor system can include a water reservoir 402 in communication with one or more pumps 404, 406. In some embodiments, pressure gauge(s) 408, 410 or sensor(s) can be included in order to monitor pressure within the system. In some embodiments, the reactor system can include a reservoir for storing quantities of catalyst, such as a colloid reservoir 412. In various embodiments, the reactor system can also include a biomass reservoir 414. The catalyst and the biomass can be carried to a reaction chamber, such as an open tube reactor 420. In some embodiments, the materials can pass through a preheater 416 before reaching the reaction chamber. The reaction chamber can include a heater 418 in order to maintain the temperature therein at a desired temperature.

After passing through the reaction chamber, reaction products can pass through a cooling bath 422 and a back pressure regulator 424. It will be appreciated that the reactor system in FIG. 4 is provided by way of example only and in accordance with various embodiments herein reactor systems may not include all of the components described with respect to FIG. 4. In addition, in some embodiments, reactors systems can include additional components beyond what is described with respect to FIG. 4.

Catalysts

Catalysts herein can include those exhibiting sufficient stability in the presence of supercritical water. Catalysts herein can include metals, metal oxides, ceramics, and the like. Catalysts used with embodiments of the invention can include metal oxides with surfaces including Lewis acid sites, Bronsted base sites, and Bronsted acid sites. By definition, a Lewis acid is an electron pair acceptor. A Bronsted base is a proton acceptor and a Bronsted acid is a proton donor.

Catalysts of embodiments herein can specifically include zirconia, titania, hafnia, yttria, tungsten (VI) oxide, manganese oxide, nickel oxide, nickel, copper oxide, niobium oxide, cobalt oxide, carbon, carbon/nickel, carbon/platinum. In some embodiments catalysts can include alumina, iron oxide, metal salts, insoluble metal salts, metal oxides, metal hydroxides, metal alloys, metal complexes, and metal ion complexes. Metals of these can include alkali metals, alkaline earth metals, transition metals and poor metals. In some embodiments, the metal can include one or more of group IA, IIA, IIB, IVB, VB, VIB, VIIB, VIIIB, IB, IIB, IIIA, IVA metals. In some embodiments, the catalyst can include one or more of $CuO$, $KH_2PO_4$, $Nb_2O_5$, $Y_2O_3$, $ZnO$, $MgCO_3$, $K_2CO_3$, $Fe_2O_3$, $CoO_2$. In some embodiments, the catalyst can consist essentially of one or more of any of the materials described herein.

In some embodiments, the catalyst can be, or include, a metal oxide that is stable at temperatures above 400 degrees Celsius in the presence of supercritical water. In some embodiments, the catalyst can be, or include, a metal oxide that is stable at temperatures above 450 degrees Celsius in the presence of supercritical water. In some embodiments, the catalyst can be, or include, a metal oxide that is stable at temperatures above 500 degrees Celsius in the presence of supercritical water. In some embodiments, the catalyst can be, or include, a metal oxide that is stable at temperatures above 550 degrees Celsius in the presence of supercritical water. In some embodiments, the catalyst can consist essentially of any of the foregoing.

Catalysts of embodiments herein can also include silica clad with any of the foregoing catalyst materials, such as a metal oxide selected from the group consisting of zirconia, titania, hafnia, yttria, tungsten (VI) oxide, manganese oxide, nickel oxide, nickel, copper oxide, niobium oxide, cobalt oxide, carbon carbon/nickel, carbon/platinum.

In some embodiments, the catalyst can be of a single metal oxide type. By way of example, in some embodiments, the catalyst is substantially pure zirconia. By way of example, in some embodiments, the catalyst is substantially pure titania. By way of example, in some embodiments, the catalyst is substantially pure hafnia. By way of example, in some embodiments, the catalyst is substantially pure yttria. By way of example, in some embodiments, the catalyst is substantially pure tungsten (VI) oxide. By way of example, in some embodiments, the catalyst is substantially pure manganese oxide. By way of example, in some embodiments, the catalyst is substantially pure nickel oxide.

Catalysts of embodiments herein can also include mixtures of materials, such as mixtures of materials including zirconia, titania, hafnia, yttria, tungsten (VI) oxide, manganese oxide, nickel oxide, nickel, carbon, carbon/nickel, and carbon/platinum.

Catalysts of embodiments herein can include metal oxide particles clad with carbon. Carbon clad metal oxide particles can be made using various techniques such as the procedures described in U.S. Pat. Nos. 5,108,597; 5,254,262; 5,346,619; 5,271,833; and 5,182,016, the contents of which are herein incorporated by reference. Carbon cladding on metal oxide particles can render the surface of the particles more hydrophobic.

Catalysts of embodiments herein can be made in various ways. As one example, a colloidal dispersion of zirconium dioxide can be spray dried to produce aggregated zirconium dioxide particles. Colloidal dispersions of zirconium dioxide are commercially available from Nyacol Nano Technologies, Inc., Ashland, Mass. The average diameter of particles produced using a spray drying technique can be varied by changing the spray drying conditions. Examples of spray drying techniques are described in U.S. Pat. Nos. 4,138,336 and 5,108,597, the contents of both of which are herein incorporated by reference. It will be appreciated that other methods can also be used to create metal oxide particles. One example is an oil emulsion technique as described in Robichaud et al., Technical Note, "An Improved Oil Emulsion Synthesis Method for Large, Porous Zirconia Particles for Packed- or Fluidized-Bed Protein Chromatography," Sep. Sci. Technol. 32, 2547-59 (1997). A second example is the formation of metal oxide particles by polymer induced colloidal aggregation as described in M. J. Annen, R. Kizhappali, P. W. Carr, and A. McCormick, "Development of Porous Zirconia Spheres by Polymerization-Induced Colloid Aggregation-Effect of Polymerization Rate," J. Mater. Sci. 29, 6123-30 (1994). A polymer induced colloidal aggregation technique is also described in U.S. Pat. No. 5,540,834, the contents of which are herein incorporated by reference.

Metal oxide catalysts used in embodiments of the invention can be sintered by heating them in a furnace or other heating device at a relatively high temperature. In some embodiments, the metal oxide is sintered at a temperature of about 160° C. or greater. In some embodiments, the metal oxide is sintered at a temperature of about 400° C. or greater. In some embodiments, the metal oxide is sintered at a temperature of about 600° C. or greater. Sintering can be done for various amounts of time depending on the desired effect. Sintering can make metal oxide catalysts more durable. In some embodiments, the metal oxide is sintered for more than about 30 minutes. In some embodiments, the metal oxide is sintered for more than about 3 hours. However, sintering also reduces the surface area. In some embodiments, the metal oxide is sintered for less than about 1 week.

In some embodiments, the catalyst is in the form of particles. Particles within a desired size range can be specifically selected for use as a catalyst. For example, particles can be sorted by size using techniques such as air classification, elutriation, settling fractionation, or mechanical screening. In some embodiments, the size of the particles is greater than about 0.2 µm. In some embodiments, the size range selected is from about 50 nm to about 50 mm. In some embodiments, the size range selected is from about 0.2 µm to about 10 mm. In some embodiments, the size range selected is from about 0.2 µm to about 5 mm. In some embodiments, the size range selected is from about 0.2 µm to about 1 mm. In some embodiments, the size range selected is from about 1 µm to about 100 µm. In some embodiments, the size range selected is from about 5 µm to about 15 µm. In some embodiments, the average size selected is about 10 µm. In some embodiments, the average size selected is about 5 µm.

In some embodiments, the catalyst can be a particulate in the nanometer size range. In some embodiments, the catalyst can be from about 0.1 nm to about 500 nm. In some embodiments, the catalyst can be from about 1.0 nm to about 300 nm. In some embodiments, the catalyst can be from about 5.0 nm to about 200 nm. In some embodiments, the catalyst can be used in the form of a colloid.

In some embodiments, catalyst particles used with embodiments of the invention are porous. By way of example, in some embodiments the particles can have an average pore size of about 30 angstroms to about 2000 angstroms. However, in other embodiments, catalyst particles used are non-porous.

The physical properties of a porous catalyst can be quantitatively described in various ways such as by surface area, pore volume, porosity, and pore diameter. In some embodiments, catalysts of embodiments herein can have a surface area of between about 1 and about 1000 $m^2$/gram. In some embodiments, catalysts of embodiments herein can have a surface area of between about 1 and about 400 $m^2$/gram. In some embodiments, the catalyst of embodiments herein can have a surface area much higher than 400 $m^2$/gram.

In some embodiments, catalysts of embodiments herein can have a surface area of between about 1 and about 200 $m^2$/gram. Pore volume refers to the proportion of the total volume taken up by pores in a material per weight amount of the material. In some embodiments, catalysts of embodiments herein can have a pore volume of between about 0.01 mL/g and about 2 mL/g. Porosity refers to the proportion within a total volume that is taken up by pores. As such, if the total volume of a particle is 1 $cm^3$ and it has a porosity of 0.5, then the volume taken up by pores within the total volume is 0.5 $cm^3$. In some embodiments, catalysts of embodiments herein can have a porosity of between about 0 and about 0.8. In some embodiments, catalysts of embodiments herein can have a porosity of between about 0.3 and 0.6.

Catalyst particles used with embodiments of the invention can have various shapes. By way of example, in some embodiments the particle can be in the form of spherules. In other embodiments, the particle can be a monolith. In some embodiments, the particle can have an irregular shape.

The Lewis acid sites on catalysts of embodiments herein can interact with Lewis basic compounds. Thus, in some embodiments, Lewis basic compounds can be bonded to the surface of catalysts. However, in other embodiments, the catalysts used with embodiments herein are unmodified and have no Lewis basic compounds bonded thereto. A Lewis base is an electron pair donor. Lewis basic compounds of embodiments herein can include anions formed from the dissociation of acids such as hydrobromic acid, hydrochloric acid, hydroiodic acid, nitric acid, sulfuric acid, perchloric acid, boric acid, chloric acid, phosphoric acid, pyrophosphoric acid, chromic acid, permanganic acid, phytic acid and ethylenediamine tetramethyl phosphonic acid (EDTPA), and the like. Lewis basic compounds of embodiments herein can also include hydroxide ion as formed from the dissociation of bases such as sodium hydroxide, potassium hydroxide, lithium hydroxide and the like.

The anion of an acid can be bonded to a metal oxide of embodiments herein by refluxing the metal oxide in an acid solution. By way of example, metal oxide particles can be refluxed in a solution of sulfuric acid. Alternatively, the anion formed from dissociation of a base, such as the hydroxide ion formed from dissociation of sodium hydroxide, can be bonded to a metal oxide by refluxing in a base solution. By way of example, metal oxide particles can be refluxed in a solution of sodium hydroxide. The base or acid modification can be achieved under exposure to the acid or base in either batch or continuous flow conditions when disposed in a reactor housing at elevated temperature and pressure to speed up the adsorption/modification process. In some embodiments, fluoride ion, such as formed by the dissociation of sodium fluoride, can be bonded to the particles.

In some embodiments, catalyst particles can be packed into a housing, such as a column. Disposing catalyst particles in a housing is one approach to facilitating continuous flow processes. Many different techniques can be used for packing the catalyst particles into a housing. The specific technique used may depend on factors such as the average particle size, the type of housing used, etc. Generally speaking, particles with an average size of about 1-20 microns can be packed under pressure and particles with an average size larger than 20 microns can be packed by dry-packing/tapping methods or by low pressure slurry packing. In some embodiments, the catalyst particles of embodiments herein can be impregnated into a membrane, such as a PTFE membrane.

However, in some embodiments, catalysts used with embodiments of the invention are not in particulate form. For example, a layer of a metal oxide can be disposed on a substrate in order to form a catalyst used with embodiments of the invention. The substrate can be a surface that is configured to contact the feedstocks during processing. In one approach, a catalyst can be disposed as a layer over a surface of a reactor that contacts the feedstocks. Alternatively, the catalyst can be embedded as a particulate in the surface of an element that is configured to contact the feedstocks during processing.

Feedstocks

Feedstocks for embodiments herein can include carbon sources including both renewable carbon sources and non-renewable carbon sources. By way of example, renewable carbon sources can include, but are not limited to, plant-based, microorganism based, and/or animal based biomass. Renewable carbon sources can specifically include carboxylic acids, fatty acids, triglycerides, carbohydrates, biopolymers, and the like.

Renewable carbon sources can specifically include lipid feed stocks that can be derived from many different sources. In some embodiments, lipid feed stocks used in embodiments of the invention can include biological lipid feed stocks. Biological lipid feed stocks can include lipids (fats or oils) produced by any type of microorganism, fungus, plant or animal. In an embodiment, the biological lipid feed stocks used include triglycerides. Many different biological lipid feed stocks derived from plants can be used.

Plant-based feed stocks can include rapeseed oil, soybean oil (including degummed soybean oil), canola oil, cottonseed oil, grape seed oil, mustard seed oil, corn oil, linseed oil, safflower oil, sunflower oil, poppy-seed oil, pecan oil, walnut oil, oat oil, peanut oil, rice bran oil, camellia oil, castor oil, and olive oil, palm oil, coconut oil, rice oil, algae oil, seaweed oil, Chinese Tallow tree oil. Other plant-based biological lipid feed stocks can be obtained from argan, avocado, babassu palm, balanites, borneo tallow nut, brazil nut, calendula, camelina, caryocar, cashew nut, chinese vegetable tallow, cocoa, coffee, cohune palm, coriander, cucurbitaceae, euphorbia, hemp, illipe, jatropha, jojoba, kenaf, kusum, macadamia nuts, mango seed, noog abyssinia, nutmeg, opium poppy, perilla, pili nut, pumpkin seed, rice bran, sacha inche, seje, sesame, shea nut, teased, allanblackia, almond, chaulmoogra, cuphea, jatropa curgas, karanja seed, neem, papaya, tonka bean, tung, and ucuuba, cajuput, clausena anisata, davana, galbanum natural oleoresin, german chamomile, hexastylis, high-geraniol monarda, juniapa-hinojo sabalero, lupine, melissa officinalis, milfoil, ninde, patchouli, tarragon, and wormwood.

Many different feed stocks derived from animals can also be used. By way of example, animal-based biological lipid feed stocks can include choice white grease, lard (pork fat), tallow (beef fat), fish oil, and poultry fat.

Many different feed stocks derived from microorganisms (Eukaryotes, Eubacteria and Archaea) can also be used. By way of example, microbe-based lipid feed stocks can include the L-glycerol lipids of Archaea and algae and diatom oils. Many different lipid feed stocks derived from fungus (e.g. Yeasts) can also be used.

In some embodiments, feed stocks derived from both plant and animal sources can be used such as yellow grease, white grease, and brown grease. By way of example, yellow, white or brown grease can include frying oils from deep fryers and can thus include fats of both plant and animal origin. Lipid feed stocks can specifically include used cooking oil. Brown grease (also known as trap grease) can include fats extracted from waste water treatment and sewage systems and can thus include fats of both plant and animal origin. In some embodiments, lipid feed stocks used in embodiments of the invention can include non-biological lipid feed stocks. Lipid feed stocks of embodiments herein can include black oil.

In some embodiments, feed stocks can be derived from microorganisms such as bacteria, protozoa, algae (such as algae oil, whole algae biomass, algae paste, algae powder), and fungi. Lipid feed stocks of embodiments herein can also include soap stock and acidulated soap stock.

Lipid feed stocks used with embodiments of embodiments herein can specifically include low value feed stocks. Low value feed stocks, such as various types of animals fats and waste oils, generally have a relatively high concentration of free fatty acids. One method of assessing the concentration of free fatty acids is to determine the acid number (or acid value) of the feed stock. The acid number is the mass of potassium hydroxide (KOH) in milligrams that is required to neutralize one gram of the chemical substance being assessed. The precise acid number as measured can vary because of the heterogeneity of the lipid feed stock. However, as an example, a high value feed stock such as virgin soybean oil can have an acid number of about 0.35 whereas a lower value feed stock such as swine tallow can have an acid number of about 5. Yellow grease, a low value feed stock, can have an acid number of about 15 while acidulated soap stock, also a low value feed stock, can have an acid number of about 88.

In some embodiments, the feed stock used has an acid number of about 3 (mg KOH/g oil) or greater. In some embodiments, the feed stock used has an acid number of about 5 (mg KOH/g oil) or greater. In some embodiments, the feed stock used has an acid number of about 10 (mg KOH/g oil) or greater. In some embodiments, the feed stock used has an acid number of about 50 (mg KOH/g oil) or greater.

Carbohydrates used with embodiments herein can include, but are not limited to, monosaccharides, disaccharides, polysaccharides, and the like. Carbohydrates used with embodiments herein can specifically include cellulose and hemicellulose.

Other materials useful as feedstocks can include lignin, pectin, and the like.

Non-renewable carbon sources can include, but are not limited to, coal, carbonaceous gases, and petroleum, or fractions thereof.

A schematic of a continuous process reactor system employing colloidal solutions is shown in FIG. 5. There are two main differences from the system described in FIG. 1. The preheater coil has been removed and the empty column is filled from bottom to top. The diagram shows the use of two high pressure pumps (Waters 590 HPLC pumps, Waters Corporation, Milford, Mass.) 506, 508 that draw from water and heated (using a hot plate) lipid reservoirs. Both reservoirs 502, 504 were continuously sparged with nitrogen to minimize the effect of dissolved oxygen on the reaction. Both zirconia colloids suspension and soybean were pumped and combined using a "T" fitting and enter into an independently thermostated 150 mm×10 mm blank reactor 510. Temperature control was achieved using EZ-Zone PM Watlow (St. Louis, Mo.) temperature controllers. The hot product stream was cooled through a cooling coil 512. The backpressure of the system was maintained through the use of a backpressure regulator 514 obtained from Tescom (Elk River, Minn.), after which the cooled effluent was collected in a reservoir 516. The recovered effluent spontaneously separated into two distinct phases with the top phase being primarily biofuel while the bottom layer was water with colloids.

The present invention may be better understood with reference to the following examples. These examples are intended to be representative of specific embodiments of the invention, and are not intended as limiting the scope of the invention.

EXAMPLES

Example 1

Production of Zirconia-Based Fixed Bed Catalytic Reactor

Catalyst particles were packed at ZirChrom Separations (Anoka, Minn.) into reactors using a downward slurried high-pressure packing station (Alltech Associates, Deerfield, Ill.). The particles were packed into an all-stainless steel reactor fitted with 2-micron stainless steel fits on each end obtained from Idex Corporation (Lake Forest, Ill.). The small reactor size used for this lab-scale work had a dimension of 1.0 cm i.d.×15 cm in length. A slurry was formed by adding the particles to HPLC grade methanol (20 g of particles in 20 g of MeOH). Reactor packing pressures of 2,000 PSI were used with methanol as the pusher solvent for the reactors. Each reactor was allowed to pack and compress for 15 minutes under pressure. The high pressure packing pump from Haskel (Burbank, Calif.) was then shut off and the reactor was allowed to slowly bleed off pressure while remaining attached to the packing apparatus. When the pressure had been fully released, the reactor was disconnected from the apparatus and the frit and end-fitting were attached to the inlet to complete construction.

Example 2

Continuous Biofuels Production System Design

A schematic of the continuous production process reactor design used is shown in FIG. 6. The diagram shows the use of two high pressure Waters 590 HPLC pumps 606, 608 obtained from Waters Corporation (Milford, Mass.) that draw from a water 604 and a heated biomass feedstock reservoir 602 which are continuously sparged with nitrogen to minimize the effect of dissolved oxygen on the system. The biomass feedstock (e.g. oleic acid, Camelina oil, Jatropha oil, algae oil, soybean oil, distiller's grain corn oil) was first filtered by passing the liquid under high pressure through a blank stainless steel reactor (1 cm i.d.×15 cm long) 610 fitted with two 2 micron stainless steel frits before it entered the heat exchanger 612 and before it was combined with water. Both the water and biomass feedstock streams were then pumped into a heat exchanger that consisted of two welded ⅛th inch o.d. stainless steel tubes (Alltech Associates, Deerfield, Ill.) where the heat from the hot effluent from the reactor is exchanged with the incoming reactant streams (water and feedstock). After the heat exchanger, the two reactant streams were combined using a "T" and then passed through an electrically driven preheater 614 that brought the mixture to the desired set point temperature before it entered the independently thermostated fixed bed catalytic reactor 616. The temperature control was achieved using EZ-Zone PM Watlow (St. Louis, Mo.) temperature controllers. The custom preheater was used to bring the temperature of the reactants up to the desired temperature before it entered the reactor which consisted of wound stainless steel HPLC tubing in a grooved aluminum cylindrical block with an 800 watt Watlow heater in the center of the cylinder. The backpressure of the system was maintained through the use of a backpressure regulator 618 obtained from Tescom (Elk River, Minn.). The products were received in a reservoir 620. The gas was collected in container 626. Water was returned to the water reservoir 604. In some cases, the top layer was passed through a refinery 622 and collected in a container 624.

Experimental Procedure for the Following Examples

Figure 8:
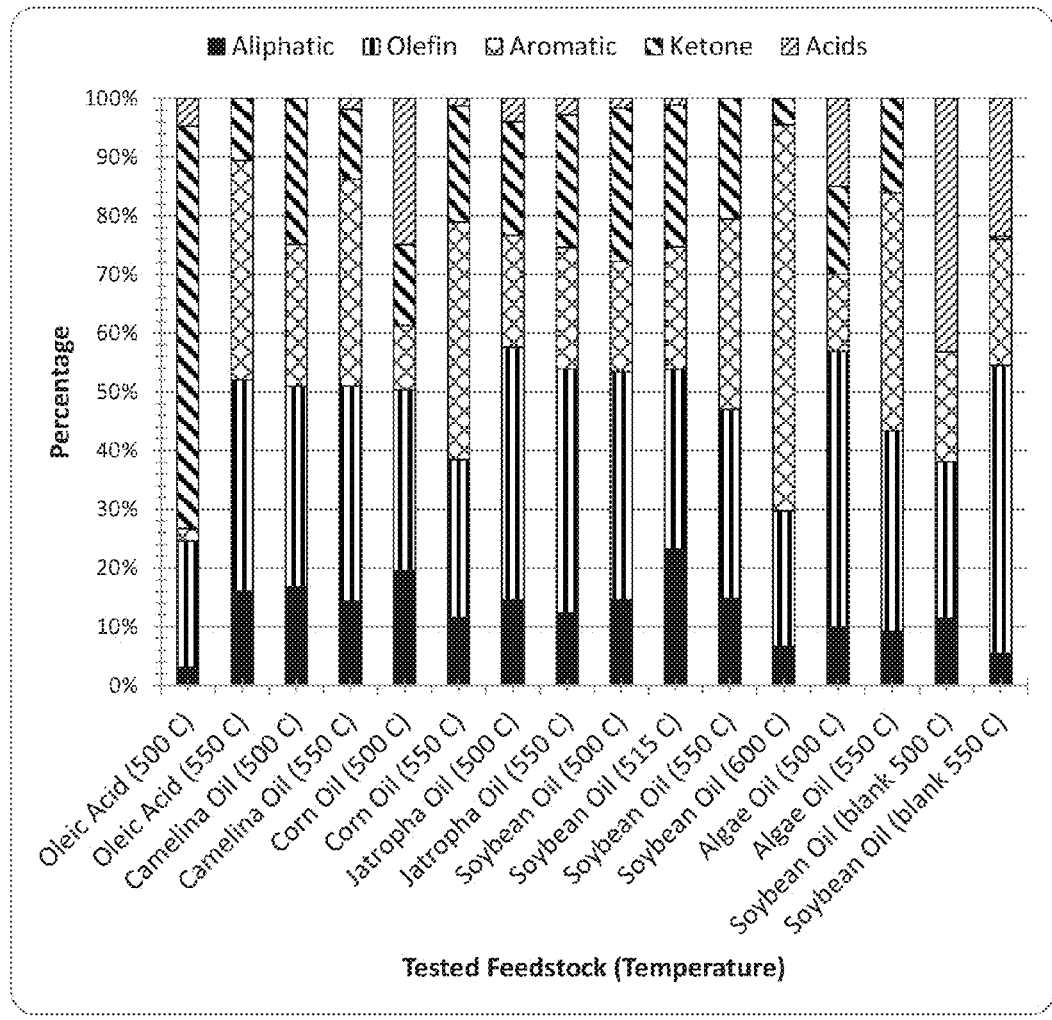
FIG. 8 is a graph of reaction product composition at various temperatures for feedstocks in accordance with various embodiments herein.

The system described above in Example 2 was heated to the desired temperature while flowing with water. Once the system was at the appropriate temperature the water was adjusted to the appropriate flow rate and the oil was introduced at the appropriate flow rate. FIG. 7 shows a list of biomass feedstocks that were tested in this study along with the experimental conditions used for reaction product production. FIG. 8 shows reaction product composition comparisons based on functionality of detected compounds by GC-MS between 500 and 550° C. for the feedstocks listed in FIG. 7. The system was allowed to achieve steady state in terms of flow rate, temperature and pressure for all samples that were analyzed for their composition. Samples were taken every 30 minutes during the production runs. Single compound feedstocks as well as natural mixtures were used in order to elucidate the chemistry of the system as a function of contact time with the catalyst, system pressure, reactor temperature and mass ratio of water and the biomass component.

In the case of aluminum dioxide as the catalyst methanol was used as the liquid medium for start up and cool down procedures. Once the system was at the desired temperature the reservoir was changed to water. After the experiment was completed the reservoir was changed back to methanol for cool down.

Instrumental Analysis for the Following Examples

The reaction products were determined gravimetrically by collecting both the gas phase and liquid phase products produced during each experimental production run. The gas and liquid products were all analyzed by GC-MS and $^1$H-NMR. $^1$H-NMR spectra were recorded on a Varian-Inova 500 MHz NMR and samples for the liquid reaction products were prepared by dissolving ~5 mg of sample in 700 μL of CDCl$_3$ (0.03% TMS) and the water-soluble products were prepared by dissolving ~5 mg of sample in 700 μL of D$_2$O. The GC-MS data was collected using a HP6890 equipped with a 30 m long HP-5MS 0.25 mm (i.d.) with 0.25 um thin film thickness capillary column. The samples were injected directly with no dilution. The GC-MS chromatographic conditions were: 0.1 μL injection volume; split ratio 200:1; 1 mL/min flow rate; Initial temp 40° C., hold for 2 min, ramp 7° C./min to 325° C. and hold for 10 min; MS detection limits of 35-600 amu.

Example 3

Continuous Production of Biofuels at Elevated Temperature and Pressure Using Pure Free Fatty Acid The reaction of oleic acid in supercritical water over zirconium dioxide was investigated at 500 and 550° C. at 3,500 psi. The product array under these conditions was comprised of a wide variety of hydrocarbons including straight chain, cyclic, aliphatic and aromatic molecules. At the lower temperature the dominant product was the ketone formed by ketonization of the oleic acid. The GC-MS data for the production runs at 500 and 550° C. are shown as an overlay of the two chromatograms in FIG. 9 (wherein the bottom chromatogram is for 500° C. and the top is for 550° C. A list of the compounds detected by GC-MS analysis along with the peak area percentage for oleic acid at 500° C. is listed in Table A1 and the $^1$H-NMR spectrum is contained in FIG. 10. In summary, FIG. 11 shows the functional group composition comparison (also contained in FIG. 8) for the GC-MS results on oleic acid at 500 and 550° C.

Figure 11:
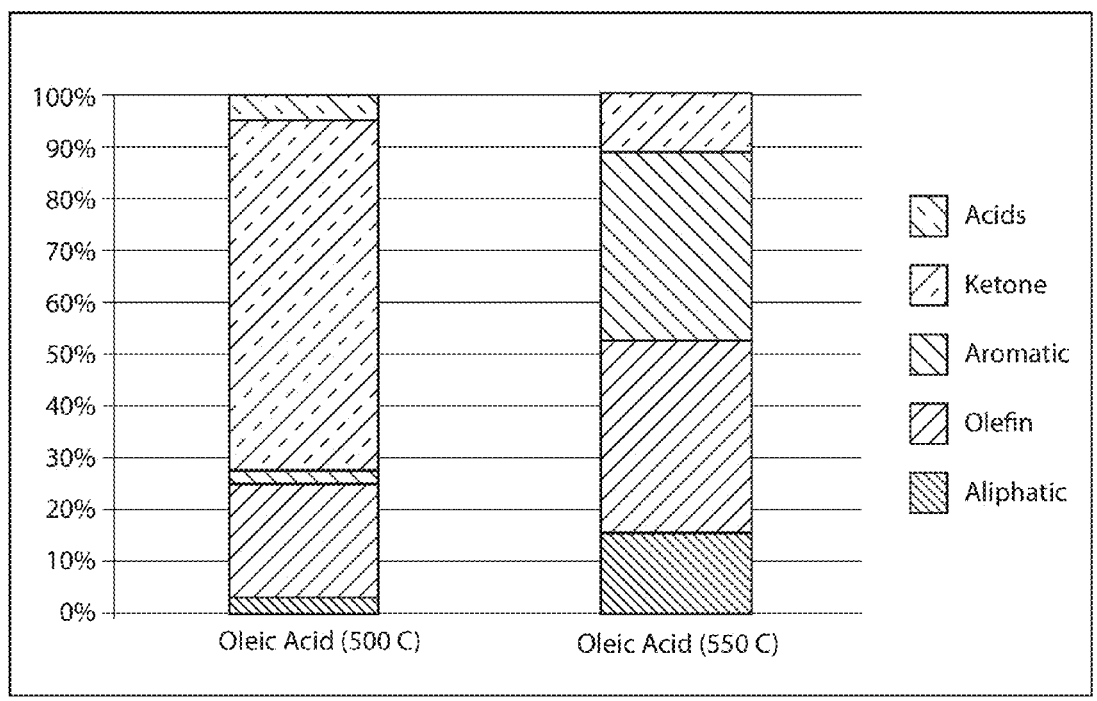
FIG. 11 is a graph comparing GC-MS composition normalized for oleic acid at different temperatures in accordance with various embodiments herein.

The GC-MS comparison shown in FIG. 11 is a useful representation of typical product profiles observed for other feedstocks at these temperatures. Ketonization is favored in high acid number feedstocks versus triglyceride feedstocks. At 500° C. the reaction of oleic acid in supercritical water over zirconia is dominated by ketone formation, in particular the dimer formed from the coupling of two oleic acid molecules followed by CO$_2$ loss. The rest of the product mixture is made up of a variety of olefins, cyclic and linear compounds (mostly alpha) and a smaller amount of unreacted oleic acid.

When the temperature is increased to 550° C. the product composition undergoes dramatic changes. First, the conversion of oleic acid goes to completion and the amount of ketone decreases substantially. This is accompanied by a large increase in aromatic content, olefin content and, to a lesser extent, aliphatic content. Interestingly, the olefin content appears to be comprised of mostly linear, terminal olefins. The increase in terminal olefin content coupled with the decrease in ketone content suggests a Mcafferty-like fragmentation of long chain ketones is taking place. This evidence is supported by the presence of methyl ketones such as 2-heptadecanone and 2-nonadecanone. Also of note, if the olefins were hydrogenated to aliphatics, the component ratios would bear a close resemblance to petroleum-derived liquid fuels.

Example 4

Comparison of Catalyzed and Uncatalyzed Supercritical Water Conversion

To examine the effect of the catalyst on the both the conversion efficiency to reaction products and reaction product composition, the thermal conversion of soybean oil to reaction products in supercritical water was studied in the absence of a catalyst (FIG. 7, entries 15 and 16) and the presence of a catalyst (FIG. 7, entries 9 and 11) at 500 and 550° C. Basic definitions were established to allow for comparison among experiments. Conversion efficiency to biofuel was defined as the sum of the GC-MS derived percentages for aliphatics, olefins, aromatics and ketones. A formula is shown in equation 1. Equation 2 contains the numerical definition used for biofuel selectivity. It was defined as the product of mass yield and conversion efficiency The blank experiments at 500 and 550° C. gave 72% and 51% liquid mass recovery yields, with 57% and 77% conversion to biofuel products and the calculated selectivity to biofuel for each experiment was 41% and 39%, respectively. The zirconia catalyzed reaction results in similar mass yields of 75% and 47% for the reaction of soybean oil with supercritical water at 500 and 550° C., but the biofuel product yields increased to 98% and 100% demonstrating the dramatic effect of the catalyst. Thus the catalyzed reaction shows a much higher selectivity to biofuel at values of 74% (34% increase) and 47% (8% increase) than the uncatalyzed reaction.

$$\text{Conversion Efficiency} = \Sigma_{mass\%}^{aliphatic} + \Sigma_{mass\%}^{olefin} + \Sigma_{mass\%}^{aromatic} + \Sigma_{mass\%}^{ketone} \quad \text{Eq 1}$$

$$\text{Bio fuel Selectivity} = (\text{Liquid Mass yield}) \times (\text{Biofuel Conversion Efficiency}) \times 100\% \quad \text{Eq 2}$$

The comparison of reaction products for each condition revealed notable differences. The uncatalyzed reaction at 500° C. produced a number of aliphatic, olefinic and aromatic compounds, but the GC-MS chromatogram is dominated by the presence of long chain fatty acids. This is presumably the result of non-catalytic hydrolysis in supercritical water with the other products arising from thermal decomposition.

The zirconia catalyzed reaction yields reaction products with increased selectivity to aliphatics, olefins and aromatics along with the addition of long chain ketone production.

Figure 12:
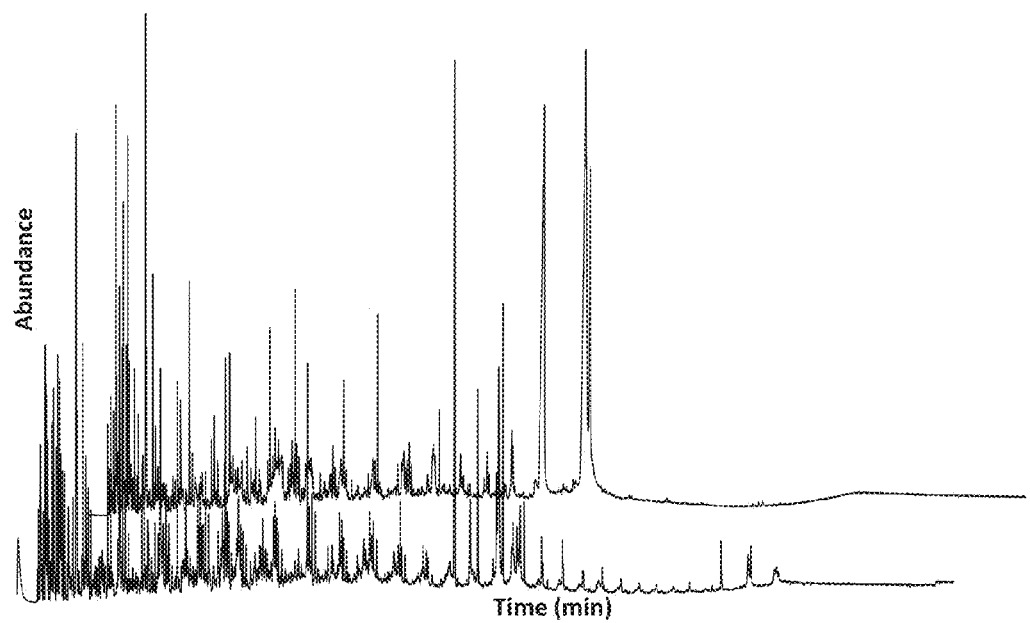
FIG. 12 is an image of GC MS spectrum of products from the reaction of soybean oil and water with a catalyst and without a catalyst in accordance with various embodiments herein.

The GC-MS chromatograms for soybean oil with supercritical water at 550° C. both catalyzed and uncatalyzed are shown in FIG. 12 (wherein the bottom chromatogram is for reaction products made with zirconia catalyst and the top line is for reaction products made without zirconia catalyst). In the uncatalyzed reaction at 550° C. the olefin content increases dramatically and a number of shorter chain carboxylic acids are produced when compared to the reaction at 500° C. These products are consistent with thermal decomposition of the soybean fatty acids.

For the zirconia catalyzed reaction at 550° C. the aromatic content increases, the fatty acids are completely absent and while the ketone content remains constant by percentage, the ketone products undergo fragmentation to various methyl ketones.

Example 5

Testing of Other Metal Oxides

Figure 13:
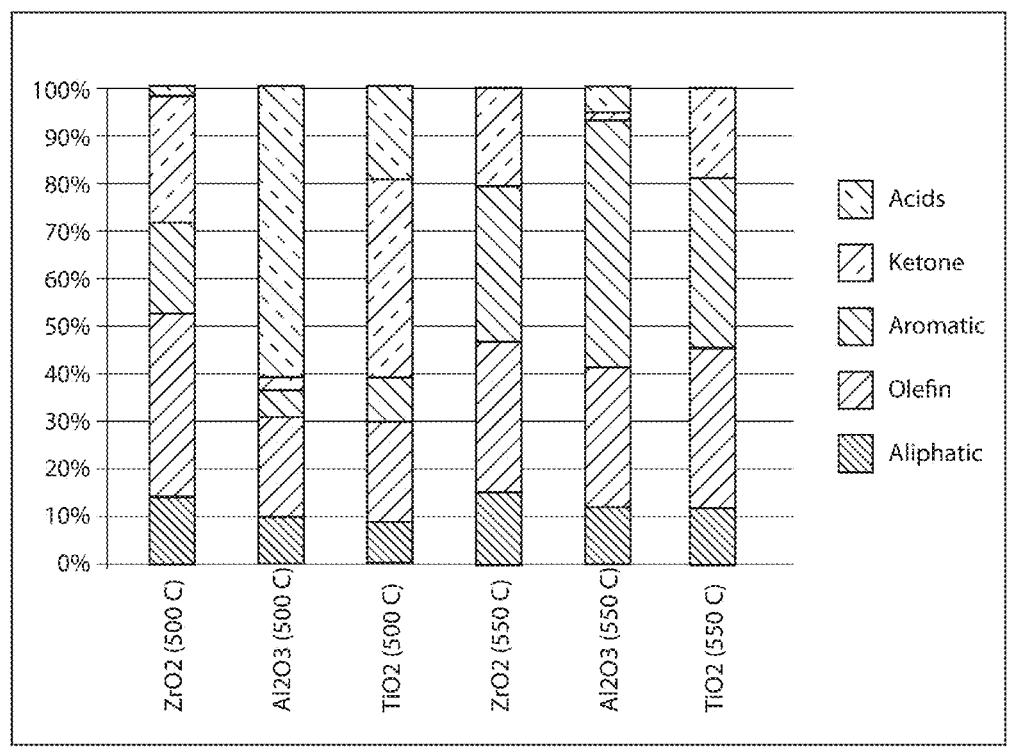
FIG. 13 is a graph comparing GC-MS composition normalized for soybean oil at different temperatures in accordance with various embodiments herein.

The thermal conversion of soybean oil with supercritical water in the presence of a metal oxide catalyst to biofuel was also investigated for aluminum dioxide ($Al_2O_3$) and titanium dioxide ($TiO_2$). Reactions were performed at 500 and 550° C. using 3:1 water:oil mass ratio and 60 second catalyst contact time. The GC-MS results obtained for the biofuels collected are shown in FIG. 13 and the results are contained in FIG. 7.

Biofuel composition and selectivity showed great disparity for the catalysts at 500° C. Zirconia (FIG. 7, entry 9) yields a liquid biofuel in 75% liquid mass with 98% conversion to biofuels. This results in a calculated biofuel selectivity of 74%. However the liquid product produced using alumina catalyst (FIG. 7, entry 17) consisted mostly of free fatty acids (59%). The biofuel was recovered with a liquid mass yield of 85% and conversion efficiency of 41%, giving a biofuel selectivity of 35%. Titania catalyst (FIG. 7, entry 19) produced a liquid biofuel yield of 78% with 81% conversion efficiency and an overall selectivity of 63%. At 500° C. it appears that hydrolysis is the dominant reaction taking place for alumina, whereas ketonization (42% ketones) is favored for titania. Zirconia produces a biofuel comprised most evenly of the desired biofuel functionalities in the highest selectivity to biofuel.

At 550° C. the liquid biofuel compositions undergo significant changes. Zirconia catalyst (FIG. 7, entry 11) produces a liquid biofuel in 47% mass yield with 100% conversion to biofuel resulting in a selectivity of 47%. The biofuel composition displays a fairly even distribution of functionalities with a significant increase in aromatic content. Liquid biofuel is produced in 46% mass yield from alumina (FIG. 7, entry 18), but with an increase in biofuel conversion to 96% versus 500° C. resulting in a 44% selectivity. The biofuel produced from alumina is dominated by aromatic molecules. Titania catalyst (FIG. 7, entry 20) produced a liquid biofuel stream in 52% mass yield with 100% biofuel conversion efficiency giving a final selectivity of 52%. The biofuel produced using titania catalyst is very similar in composition and functional group distribution as the zirconia biofuel.

The increase in temperature resulted in an increase in conversion to biofuel for each catalyst tested. This indicates that temperature is an important component to biofuel production and temperatures above 500° C. are favorable for the catalysts tested as can be seen in FIG. 13. However, the liquid biofuel mass decreases with the large increase in temperature and is accompanied by significant gas production. Zirconia was selected for further study due to its activity in producing liquid biofuel with higher selectivity at lower temperatures.

Example 6

Catalyst Endurance Testing and Catalyst Regeneration

Figure 14:
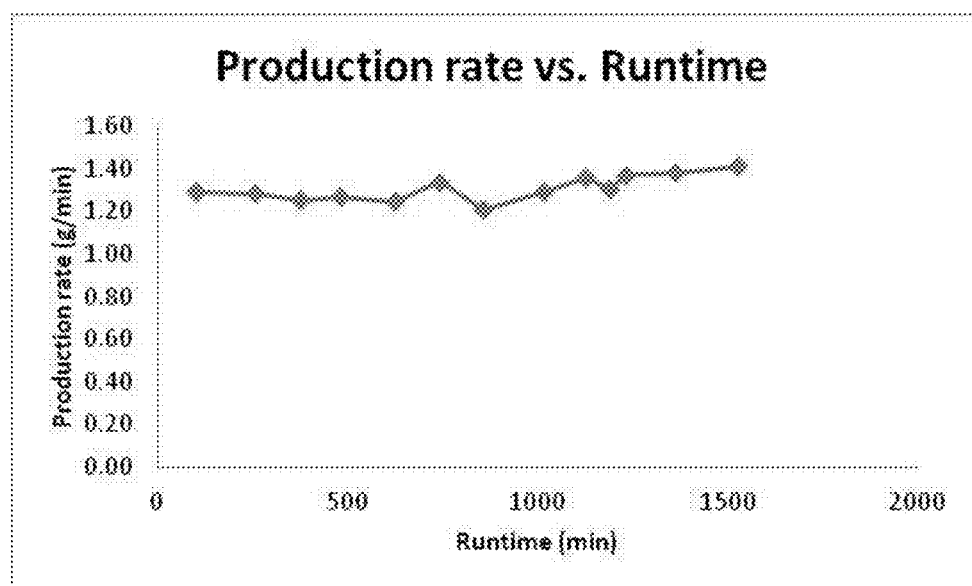
FIG. 14 is a graph showing production rate changes during an endurance study in accordance with various embodiments herein.
Figure 15:
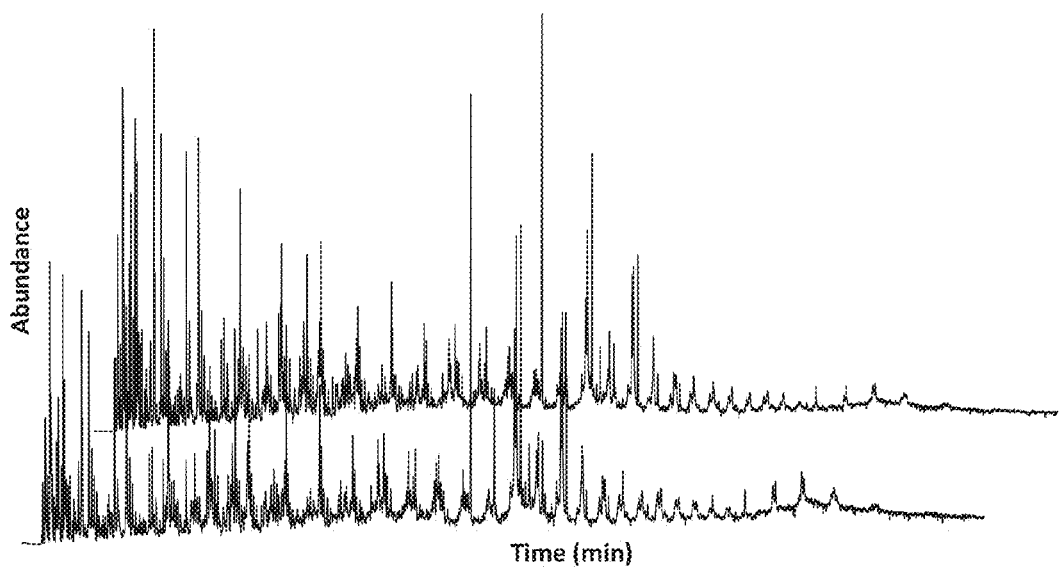
FIG. 15 is a comparison between fresh and regenerated zirconia catalyst in accordance with various embodiments herein.

FIG. 14 shows the production rate during endurance testing of an extended run where a total of 2,000 mL of biofuel was produced at 500° C., 3:1 water:soybean oil mass ratio and 60 s catalyst contact time over a 1,530-minute run performed over 5 days. The reactor maintained greater than 70% conversion efficiency (g/g) over the entire study and when the catalyst was unpacked from the reactor and measured gravimetrically, there was no appreciable loss in mass. The color of the catalyst turned from white to a dark gray color, but despite some "coking" it did not lose any appreciable catalytic activity. After regeneration of the catalyst by heating in a furnace at 500° C. for 6 hours the catalyst color was restored to its original white and upon repacking into the reactor under identical conditions the restored reactor produced identical bio-crude as shown in FIG. 15 (wherein the bottom chromatogram is for fresh catalyst and the top line is for regenerated catalyst), which contains chromatographic overlays of the results from a GC-MS analysis of biofuels produced utilizing fresh and regenerated catalyst.

Example 7

Effect of Temperature on Biofuel Yield and Composition

Temperature was found to be a significant parameter in the conversion process. There is a sharp dependence of biofuel composition and yield as a function of process temperature. For example, FIG. 16 shows the effect of process temperature on mass yield (square markers), biofuel conversion yield (triangle markers) and selectivity to biofuel (diamond markers).

Figure 16:
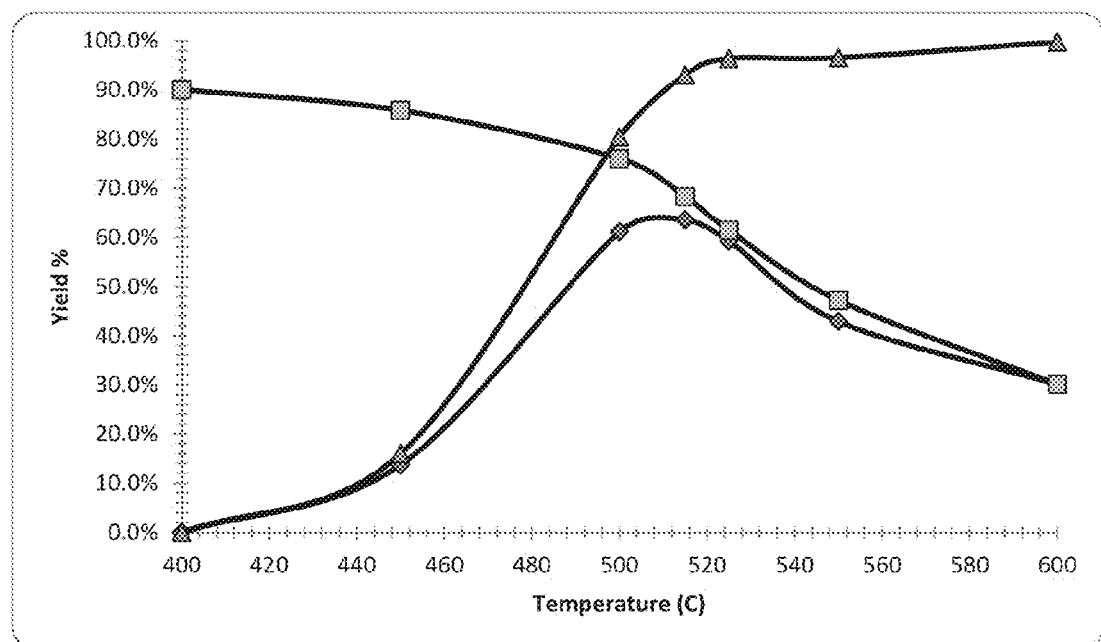
FIG. 16 is a graph of the effect of the process temperature for the conversion of soybean oil to various reaction products using zirconia catalyst and supercritical water on liquid mass yield, conversion efficiency and selectivity in accordance with various embodiments herein.

FIG. 16 shows that the yield of crude biofuel (liquid phase) decreases as temperature increases and is accompanied by an increase in gaseous products. The conversion to biofuel products increases as the temperature is increased. The composition of an exemplary product mixture herein at 500° C. is characterized by aliphatics (10-20%), olefins (30-50%), aromatics (10-25%), ketones (10-25%) and unreacted acids (1-25%). At 500° C. the ketones are mostly made up of long chain ketones formed from fatty acid ketonization which subsequently undergo fragmentation to olefins and methyl ketones as the temperature is increased. At 550° C., an exemplary product mixture composition is aliphatics (10-15%), olefins (25-40%), aromatics (20-40%), ketones (10-20%) and unreacted acids (0-5%). Thus, as temperature is increased the aromatic content sees a noticeable increase with decreases in the other functionalities. This trend is confirmed by the reaction of soybean oil (FIG. 7, entry 12) at 600° C. The biofuel composition at this temperature is 7% aliphatics, 23% olefins, 65% aromatics and 5% ketones. A final effect of temperature is on the liquid biomass yield. As the temperature is increased the liquid phase yield decreases significantly. At 500° C. there is 75% liquid mass recovery and at 600° C. there is only a 30% liquid mass recovery. This decrease in liquid mass is accompanied by a significant increase in the production of gaseous compounds.

Figure 9:
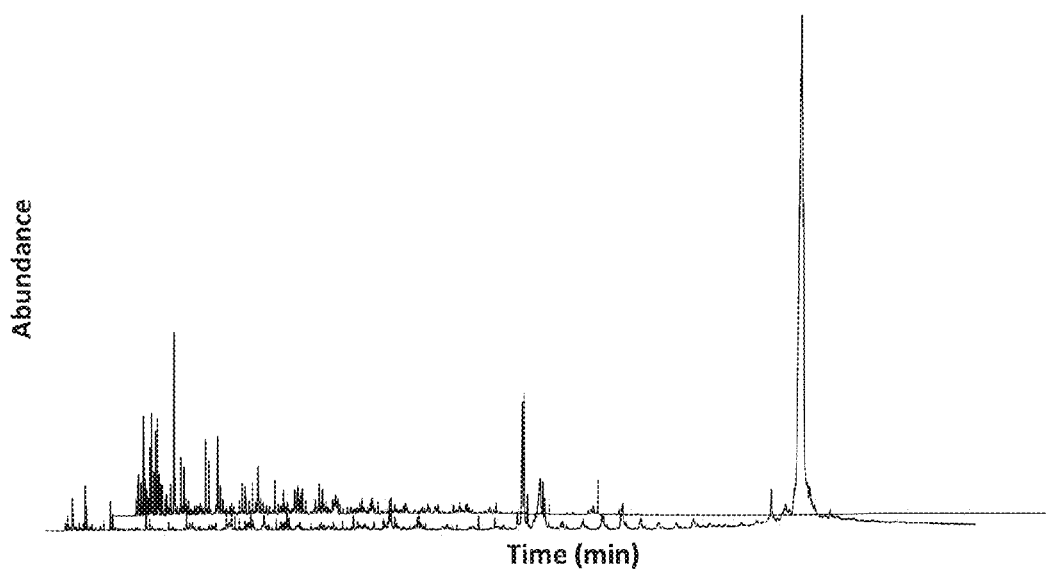
FIG. 9 is a graph of reaction products made from oleic acid at different temperatures in accordance with various embodiments herein.
Figure 10:
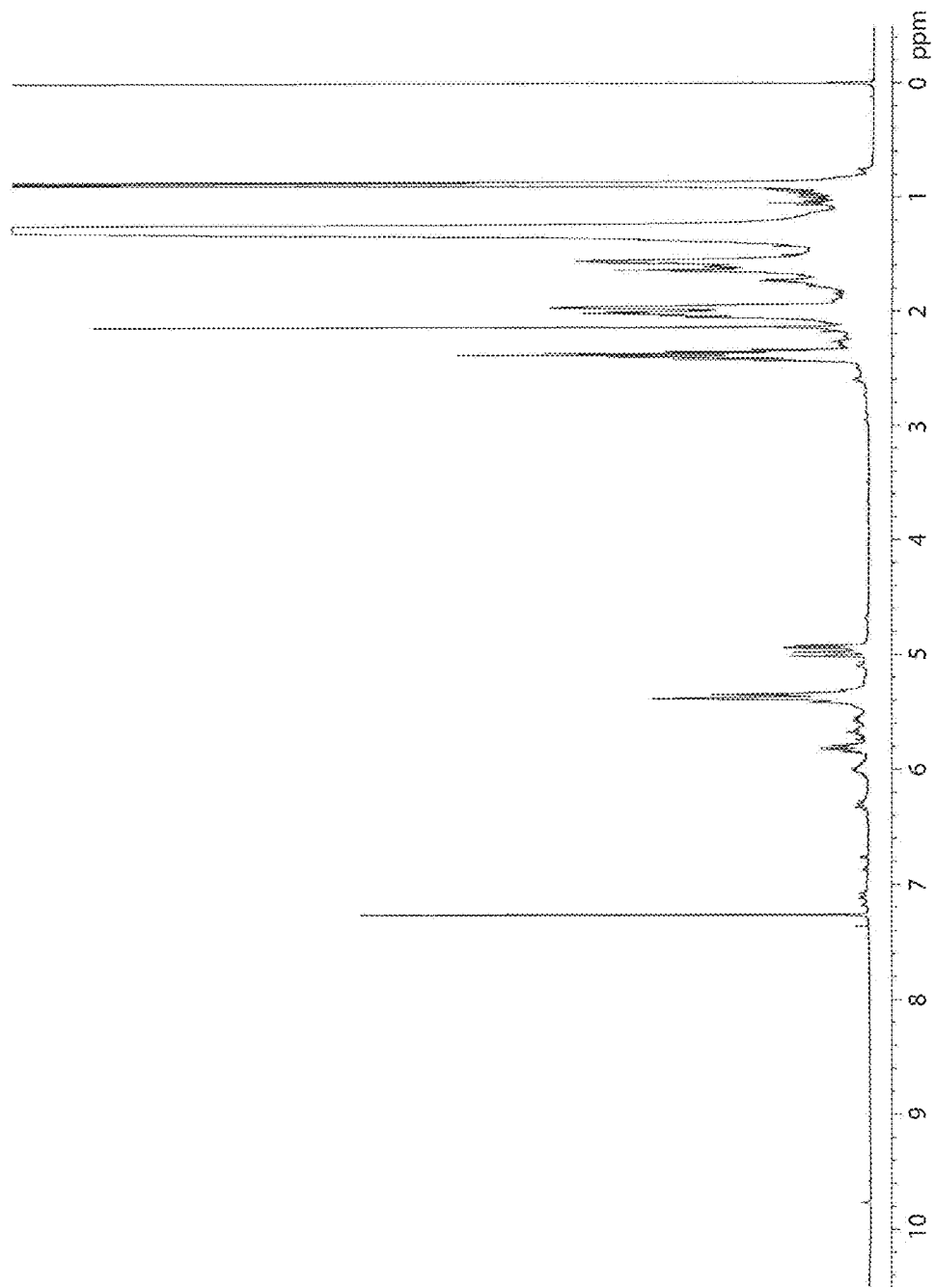
FIG. 10 is a H-NMR spectrum for reaction products made from oleic acid in accordance with various embodiments herein.

In the case of a pure acid reactant ketonization is the dominant pathway, as the overall acid concentration is high. All the remaining bars in FIG. 9 are derived from triglyceride based sources and none have remarkably high concentrations of ketones present, even at the lower temperature. While this would appear to suggest that the mechanisms of product formation are different for triglycerides versus free fatty acids, an alternative and more likely possibility is that reaction kinetics is the determining factor. This is based on the identity of products formed and the requisite mechanistic step for triglycerides that involves the hydrolysis resulting in formation of free fatty acids (FFAs). The blank entry using soybean oil, shown in the last two bar graphs in FIG. 9, contains high amounts of FFA at both temperatures. Since there is no ketonization mechanism available in the blank experiment, the FFA content accumulates and is degraded to olefins and aromatics. In the catalyzed experiments, the same hydrolysis step should occur, but the resulting FFAs continue to react on the catalyst surface and do not attain high enough concentrations to allow for long chain ketone formation to be the dominant pathway. It is recognized that other degradation pathways are available that do not require hydrolysis as the first step.

The overall composition of the starting feedstock also has an effect on the product composition. The amount and type of FFAs connected to the glycerol backbone determine the product arrays. In general, an increase in the amount of unsaturation in the FFAs (linoleates, linolenates), results in an increase in the aromatic content. The olefinic content falls into consistent ranges across the feedstocks tested. Based on the identities of the olefins and relative amounts formed it is believed that radical fragmentation of FFAs, coupled with $CO_2$ loss, explains most of the linear, terminal olefin formation. The formation of aliphatic compounds in currently unclear, mechanistically.

FIG. 16 shows that a maximum for biofuel selectivity was detected at 515° C. This is where the mass yield and conversion to biofuel yield reach their apex as seen in the plot of biofuel selectivity. Entry 10 in FIG. 7 contains the data for the conversion of soybean oil to biofuel at 515° C. and the biofuel composition is shown in FIG. 7. These conditions resulted in good conversion of soybean oil to biofuel based on acid number titration, good yields of biofuel determined gravimetrically, an ideal biofuel composition for subsequent distillation and extended run times before coking of the catalyst.

Example 8

Scale Up Study Using Soybean Oil as Feedstock

Figure 17:
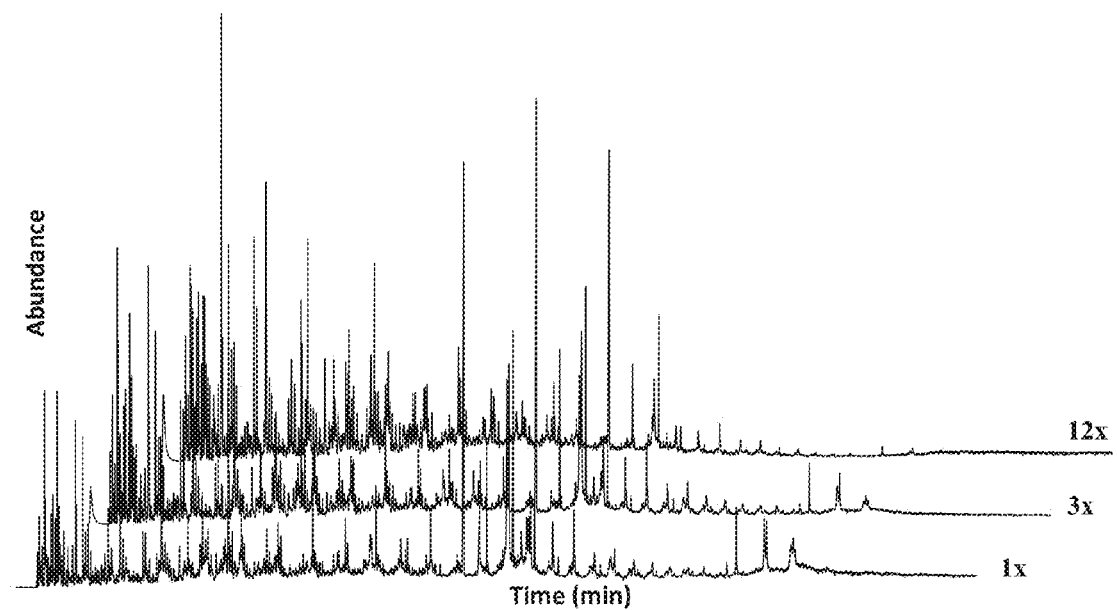
FIG. 17 is a GC-MS overlay of the liquid biofuel produced in the scale-up study of biofuel production from soybean oil using zirconia catalyst and supercritical water in accordance with various embodiments herein.

The process described above for the conversion of soybean oil to biofuel was scaled up by increasing the reactor volume by a factor of 3 and then by a factor of 12 to achieve an annualized potential ideal production level of more than 30,000 gallons per year with a contact time of 60 seconds. The catalyst used in this study was 10 micron, 300 Å unmodified zirconia. Each system was run for more than 8 hours continuously using refined soybean oil and water as the feedstocks with a molar ratio of 1:120, respectively, and a reactor temperature of 515° C. Samples were taken every hour and the percent yield determined gravimetrically. The product composition was analyzed by GC-MS as shown in FIG. 17, which overlays samples of biofuel taken from each increase in scale (wherein the bottom chromatogram is at 1×, the middle chromatogram is at 3×, and the top chromatogram is at 12×). The average yield over the study on a mass basis was 68%. The process scaled up linearly and no significant drop in conversion rate was observed over the course of the study.

Example 9

ASTM Testing of Light Distillate (Gasoline-Like Fraction)

A total of five liters of biofuel was made from soybean oil for fractionation, and subsequent ASTM testing of the gasoline-like light distillate, utilizing optimized conditions of 515° C., 3:1 water:soybean oil mass ratio, 10 micron zirconia catalyst and 60 second catalyst contact time. The biofuel was fractionated by simple distillation at 120° C. under atmospheric pressure and the light distillate was collected in 33% yield, by mass. The collected distillate was subjected to ASTM D4814 quality tests, which are typically used for gasoline, by an outside laboratory (Southwest Research Institute, Houston, Tex.). The results of this testing are shown in Table A2. These results indicate that the distilled biofuel has properties similar to gasoline.

Example 10

Gaseous Products and Other Byproducts

When the samples were analyzed gravimetrically it was observed that there was a loss of 25% (experiment 9 in FIG. 7) of the mass (input versus output) for zirconia catalyst. This loss in mass was determined to be caused by the formation of gaseous products. This gaseous product formation has been observed by others and corroborates previous work that has observed the elimination of carbon dioxide, and dehydration of glycerol to gaseous products under supercritical water conditions. In order to investigate the gaseous reaction products from this type of catalyst system the gas was collected from experiment 9 in FIG. 7 and analyzed by head-space gas chromatography with mass spectrometry (HS-GC-MS). Gases such as hydrogen, carbon monoxide, methane, and carbon dioxide, ethane, ethene, and propane were found to be in the gas sample. The water soluble products were also analyzed and found to be comprised mainly of acetone, methanol, and ethanol.

Example 11

Mass Balance for Soybean Oil

Table A3 shows the mass balance of the conversion of soybean oil to biofuel at 500° C., 3:1 water:soybean oil mass ratio, 10 micron zirconia and 60 s catalyst contact time. During this specific experiment the soybean oil was converted into 73.3% water insoluble products (biofuel), 9.8% of water soluble products, and 10.8% gaseous products (e.g. hydrogen, carbon monoxide, carbon dioxide, methane, ethane, ethene and small volatiles). GC-MS identification of the water soluble organics was performed and showed that 3.1% acetone, 6.4% acetic acid, and 0.3% propanoic acid of the product mass were produced.

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration to. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

The invention has been described with reference to various specific and preferred embodiments and techniques. However, it should be understood that many variations and modifications may be made while remaining within the spirit and scope of the invention.

Appendix Of Tables

TABLE A1

GC-MS product results for oleic acid at 500° C. over zirconia catalyst.

| Peak # | Peak Name | RT | % of Total Peak Area |
|---|---|---|---|
| 1 | 2-Cyclopenten-1-one, 5-hydroxy-2,3-dimethyl- | 1.288 | 0.11% |
| 2 | 1-Pentene | 1.401 | 0.31% |
| 3 | 1-Hexene | 1.682 | 0.71% |
| 4 | Cyclopentene, 1-methyl- | 2.063 | 0.15% |
| 5 | Cyclohexene | 2.308 | 0.11% |
| 6 | 1-Heptene | 2.392 | 0.60% |
| 7 | Heptane | 2.481 | 0.36% |
| 8 | Cyclohexane, methyl- | 2.771 | 0.13% |
| 9 | Cyclohexene, 1-methyl- | 3.461 | 0.24% |
| 10 | 1-Octene | 3.812 | 0.39% |
| 11 | Octane | 3.966 | 0.23% |
| 12 | 1-Nonene | 5.855 | 0.36% |

TABLE A1-continued

GC-MS product results for oleic acid at 500° C. over zirconia catalyst.

| Peak # | Peak Name | RT | % of Total Peak Area |
|---|---|---|---|
| 13 | Nonane | 6.041 | 0.14% |
| 14 | Cyclopentene, 1-butyl- | 7.114 | 0.12% |
| 15 | 2-Octanone | 8.13 | 0.40% |
| 16 | Decane | 8.316 | 0.18% |
| 17 | 4-Decene | 8.452 | 0.27% |
| 18 | Cyclopentene, 1-pentyl- | 9.388 | 0.16% |
| 19 | Cyclodecene, (Z)- | 9.789 | 0.10% |
| 20 | 1-Undecene | 10.374 | 0.58% |
| 21 | 3-Undecene, (E)- | 10.504 | 0.12% |
| 22 | Undecane | 10.558 | 0.15% |
| 23 | 5-Undecene | 10.68 | 0.51% |
| 24 | 5-Undecene, (E)- | 10.864 | 0.23% |
| 25 | Cyclodecene, (E)- | 11.114 | 0.16% |
| 26 | Pentylidenecyclohexane | 11.451 | 0.27% |
| 27 | Pentylidenecyclohexane | 11.655 | 0.32% |
| 28 | Undeca-2E,4E-diene | 11.753 | 0.28% |
| 29 | Undeca-2E,4E-diene | 11.874 | 0.32% |
| 30 | 1-Dodecene | 12.51 | 0.56% |
| 31 | 2-Dodecene, (Z)- | 12.792 | 0.10% |
| 32 | Cyclodecene, (Z)- | 13.208 | 0.21% |
| 33 | 5,7-Dodecadiene, (E,E)- | 13.476 | 0.28% |
| 34 | 7-Hexadecyne | 13.587 | 0.08% |
| 35 | 5,7-Dodecadiene, (E,E)- | 13.666 | 0.22% |
| 36 | 2,4-Dodecadiene, (E,Z)- | 13.822 | 0.33% |
| 37 | 2,4-Dodecadiene, (E,Z)- | 13.922 | 0.24% |
| 38 | 2-Tridecene, (E)- | 14.526 | 0.12% |
| 39 | 4-Cyclononen-1-one | 15.184 | 0.15% |
| 40 | Cyclopentene, 1-octyl- | 15.697 | 0.08% |
| 41 | (8E,10E)-Dodecadienal | 15.757 | 0.07% |
| 42 | 2-Tetradecene, (E)- | 16.423 | 0.15% |
| 43 | Phenol, 4-pentyl- | 16.957 | 0.12% |
| 44 | Cyclopentene, 1-pentyl- | 17.575 | 0.22% |
| 45 | Cyclohexene, 1-octyl- | 17.79 | 0.17% |
| 46 | 2-n-Hexylphenol | 18.216 | 0.15% |
| 47 | Heptylcyclohexane | 18.725 | 0.28% |
| 48 | Cycloundecene, 1-methyl- | 19.241 | 0.22% |
| 49 | Cyclododecanemethanol | 19.323 | 0.16% |
| 50 | Z-1,6-Tridecadiene | 19.503 | 0.16% |
| 51 | 5-Nonadecen-1-ol | 19.608 | 0.69% |
| 52 | 1-Hexadecene | 19.682 | 0.62% |
| 53 | Cyclopentane, 1,1,3-trimethyl- | 19.917 | 0.21% |
| 54 | 9-Eicosyne | 20.004 | 0.11% |
| 55 | Naphthalene, decahydro-, cis- | 21.172 | 0.27% |
| 56 | 8-Heptadecene | 21.276 | 0.37% |
| 57 | 1,9-Tetradecadiene | 21.378 | 0.19% |
| 58 | 2-Heptadecanone | 21.637 | 0.11% |
| 59 | n-Hexadecanoic acid | 24.644 | 0.17% |
| 60 | 4-Nonylphenol | 25.566 | 0.16% |
| 61 | (2-Acetyl-5-methyl-cyclopentyl)-acetic acid | 26.847 | 0.43% |
| 62 | (2-Acetyl-5-methyl-cyclopentyl)-acetic acid | 27.115 | 3.45% |
| 63 | 2-Nonadecanone | 27.222 | 4.02% |
| 64 | (3,7-Dimethylocta-2,6-dienylthio)benzene | 27.412 | 0.56% |
| 65 | d-Tyrosine | 27.768 | 0.34% |
| 66 | 9-Octadecenoic acid, (E)- | 27.87 | 0.49% |
| 67 | 1-Nonadecene | 28.112 | 3.64% |
| 68 | E,E,Z-1,3,12-Nonadecatriene-5,14-diol | 28.285 | 1.06% |
| 69 | 3-Eicosanone | 28.376 | 0.86% |
| 70 | 1-Propen-3-imine, N-cyclohexyl-, N-oxide | 28.604 | 0.12% |
| 71 | Cyclopropane, 1-(1-hydroxy-1-heptyl)-2-methylene-3-pentyl- | 29.399 | 0.19% |
| 72 | 12-Methyl-E,E-2,13-octadecadien-1-ol | 30.57 | 0.40% |
| 73 | 1-Pentacosanol | 31.695 | 0.82% |
| 74 | Cyclohexane, 1,1'-dodecylidenebis[4-methyl- | 32.733 | 0.67% |
| 75 | 1-Hexacosene | 32.793 | 0.69% |
| 76 | 1-Cyclohexylnonene | 33.831 | 0.54% |
| 77 | [1,2'-Binaphthalene]-5,5',8,8'-tetrone, 1',4-dihydroxy-2,3'-dimethyl-, (−)- | 34.808 | 0.33% |
| 78 | Cyclohexaneethanol, 4-methyl-.beta.-methylene-, trans- | 35.837 | 0.28% |
| 79 | Anthracene, 9,10-dihydro-9,9,10-trimethyl- | 36.804 | 0.30% |
| 80 | 2-Butoxy-6-(4-nitro-phenyl)-naphthalene | 40.39 | 0.14% |
| 81 | E-11-Methyl-12-tetradecen-1-ol acetate | 41.197 | 1.50% |

TABLE A1-continued

GC-MS product results for oleic acid at 500° C. over zirconia catalyst.

| Peak # | Peak Name | RT | % of Total Peak Area |
|---|---|---|---|
| 82 | Cyclopropaneundecanal, 2-nonyl- | 41.32 | 0.30% |
| 83 | 2,4-Cyclohexadien-1-one, 3,5-bis(1,1-dimethylethyl)-4-hydroxy- | 42.01 | 1.87% |
| 84 | Butanedioic acid, (triphenylphosphoranylidene)-, dimethyl ester | 42.204 | 0.70% |
| 85 | 9,26-Pentatriacontadien-18-one | 42.931 | 57.98% |
| 86 | 1,3-Bis(trimethylsilyl)benzene | 43.358 | 2.14% |
| 87 | 1,3-Bis(trimethylsilyl)benzene | 43.642 | 0.94% |

TABLE A2

ASTM testing results based on ASTM D4814

| | | Sample Identification | | |
|---|---|---|---|---|
| | | ST44-05D SwRI Lab ID | ASTM D4814 Specification | |
| TEST Method | Units | 6786 | Min | Max |
| ASTM D5191 Vapor Pressure | | | | |
| RVP | psi | 4.49 | — | 7.8-15.01 |
| pTot | psi | 5.06 | — | — |
| ASTM D130 Copper Corrosion | | | | |
| Cu Corrosion | rating | 1A | — | 1 |
| ASTM D1319 Hydrocarbon Type | | | | |
| Aromatics | vol % | 19.1 | — | — |
| Olefins | vol % | 65.1 | — | — |
| Saturates | vol % | 15.7 | — | — |
| ASTM D2699 Research Octane Number | | | | |
| RON | ON | 81.4 | — | — |
| ASTM D2700 Motor Octane Number | | | | |
| MON | ON | 73 | — | — |
| ASTM D4814 Anti Knock Index | | | | |
| AKI (R + M)/2 | ON | 77.2 | 85.02 | — |
| ASTM D3231 Phosphorus | | | | |
| Phosphorus | mg/L | 0.48 | — | 1.3 |
| ASTM D3237 Lead Content | | | | |
| Lead | g/gal | <0.001 | — | 0.05 |
| ASTM D381 Gum Content | | | | |
| Unwashed Gum | mg/100 ml | 11 | — | — |
| Washed Gum | mg/100 ml | 6 | — | 5 |
| ASTM D4052 API, Specific Gravity | | | | |
| API @ 60° F. | ° | 50 | — | — |
| Sp. Gravity @ 60° F. | g/ml | 0.7797 | — | — |
| Density @ 15° C. | g/ml | 0.7795 | — | — |
| ASTM D4814 Annex 1 Silver Corrosion | | | | |
| Ag corrosion | rating | 0 | — | 1 |
| ASTM D5188 Vapor Liquid Ratio | | | | |
| V/L | ° F. | >176.0 | 95-140 | — |
| ASTM D525 Oxidation Stability | | | | |
| Run Time | min | 1440 | — | — |
| Break | Y/N | Y | — | — |
| Induction period | min | 80 | 240 | — |
| ASTM D5453 Sulfur Content | | | | |
| Sulfur | ppm | 1.4 | — | 80 |
| ASTM D5599 Oxygenate Content | | | | |
| Ethanol | wt % | <0.1 | — | — |
| MTBE | wt % | <0.1 | — | — |
| DIPE | wt % | <0.1 | — | — |
| Total Oxygen | wt % | 1.563 | — | — |
| ASTM D86 Distillation | | | | |
| Initial Boiling Point | ° F. | 112.4 | — | — |
| 5% Evap | ° F. | 160.2 | — | — |
| 10% Evap | ° F. | 181.8 | — | 122-158 |
| 15% Evap | ° F. | 195.5 | — | — |
| 20% Evap | ° F. | 206.3 | — | — |
| 30% Evap | ° F. | 225.3 | — | — |
| 40% Evap | ° F. | 244.1 | — | — |
| 50% Evap | ° F. | 263.2 | 170 | 230-250 |
| 60% Evap | ° F. | 282.5 | — | — |
| 70% Evap | ° F. | 304.4 | — | — |
| 80% Evap | ° F. | 327.1 | — | — |
| 90% Evap | ° F. | 358.3 | — | 365-374 |
| 95% Evap | ° F. | 385.9 | — | — |
| Final Boiling Point | ° F. | 433 | — | 437 |
| Recovered | % | 98 | — | — |
| Residue | % | 1 | — | 2 |
| Loss | % | 1 | — | — |
| E200 | % | 17.05 | — | — |
| E300 | % | 68.26 | — | — |
| Driveability Index | | 1420.6 | — | 1200-12501 |

TABLE A3

Mass balance of the process for FIG. 7, entry 9

| Input | | |
|---|---|---|
| Water | 5.5567 | g/min |
| Oil | 1.8783 | g/min |

| Output | | | % |
|---|---|---|---|
| Biofuel | 1.41 | g/min | 75.1% |
| Water | 5.577 | g/min | |
| Acetone | 0.054 | g/min | 3.1% |
| Acetic acid | 0.109 | g/min | 6.4% |
| Propanoic acid | 0.005 | g/min | 0.3% |
| Gases (H2, CO, CH4, CO2, methane, ethane) | 0.2717 | g/min | 15.8% |
| Cold well | 0.0178 | g/min | 1.0% |

The invention claimed is:

1. A method for producing a hydrocarbon product stream comprising:
reacting components of a reaction mixture in the presence of a catalyst for a contact time to form a product mixture, the reaction mixture comprising a carbon source selected from the group consisting of oleic acid, camelina oil, corn oil, soybean oil, and algae oil and at least about 50% water by mass, wherein the reaction takes place at a temperature and pressure inside a reaction vessel,
wherein the temperature inside the reaction vessel is between 540 degrees Celsius and 600 degrees Celsius and the pressure inside the reaction vessel is above critical pressure of water,
wherein the product mixture comprises at least about 20% aromatics as measured by Gas Chromatography Mass Spectrometry chromatographic peak area normalization method, and
wherein the catalyst comprises a metal oxide.

2. The method of claim 1, wherein the reaction vessel is part of an extrusion system.

3. The method of claim 1, wherein the catalyst comprises a metal oxide that is stable at temperature above 540 degree Celcius in the presence of supercritical water.

4. The method of claim 1, wherein the catalyst consists essentially of a metal oxide that is stable at temperature above 540 degree Celcius in the presence of supercritical water.

5. The method of claim 1, wherein the catalyst comprises a metal oxide selected from the group consisting of zirconia, titania, and hafnia.

6. The process of claim 1, wherein the catalyst further comprises silica clad with at least one of zirconia, titania, hafnia, yttria, tungsten (VI) oxide, manganese oxide, nickel oxide, nickel, carbon, carbon/nickel, and carbon/platinum.

7. The method of claim 1, wherein the catalyst comprises zirconia.

8. The method of claim 1, wherein the catalyst consists essentially of zirconia.

9. The method of claim 1, wherein the catalyst is in colloidal form.

10. The method of claim 1, wherein the contact time is less than five minutes.

11. The method of claim 1, wherein the product mixture comprises a composition as measured by Gas Chromatography Mass Spectrometry chromatographic peak area normalization method including from about 10 to about 20 percent aliphatics, from about 25 to about 50 percent olefins, from about 10 to about 40 percent aromatics, and from about 10 to about 25 percent ketones.

12. The method of claim 1, wherein the product mixture includes at least about 0 to 40% ketones as measured by Gas Chromatography Mass Spectrometry chromatographic peak area normalization method.

13. The method of claim 1, wherein the product mixture includes at least about 1 to 40% ketones as measured by Gas Chromatography Mass Spectrometry chromatographic peak area normalization method.

14. The method of claim 1, wherein the product mixture comprises at least about 30% aromatics as measured by Gas Chromatography Mass Spectrometry chromatographic peak area normalization method.

15. The method of claim 1, further comprising distilling the product mixture.

16. The method of claim 1, wherein reacting components of the reaction mixture to form the product mixture is a one step process.

17. The method of claim 1, wherein the temperature inside the reaction vessel is less than about 580° Celsius.

18. A method for producing a hydrocarbon product stream comprising:
reacting components of a reaction mixture in the presence of a catalyst for a contact time to form a product mixture, the reaction mixture comprising a carbon source selected from the group consisting of oleic acid, camelina oil, corn oil, soybean oil, and algae oil and water, wherein the reaction takes place at a temperature and pressure inside a reaction vessel,
wherein the temperature inside the reaction vessel is about 540° Celsius to about 560° Celsius and the pressure inside the reaction vessel is above critical pressure of water,
wherein the product mixture comprises a composition as measured by Gas Chromatography Mass Spectrometry chromatographic peak area normalization method including from about 10 to about 20 percent aliphatics, from about 25 to about 50 percent olefins, from about 10 to about 40 percent aromatics, and from about 10 to about 25 percent ketones, and
wherein the catalyst comprises a metal oxide.

* * * * *